United States Patent [19]
Burkett et al.

[11] Patent Number: 4,913,038
[45] Date of Patent: Apr. 3, 1990

[54] DEEP FAT FRYER WITH COMPUTERIZED CONTROL SYSTEM

[75] Inventors: Douglas M. Burkett, Middletown; Gary L. Mercer, Alexandria; Robert W. Stirling, Englewood, all of Ohio

[73] Assignee: Henny Penny Corporation, Eaton, Ohio

[21] Appl. No.: 227,886

[22] Filed: Aug. 3, 1988

[51] Int. Cl.⁴ .............................................. A47J 27/62
[52] U.S. Cl. ................................... 99/331; 99/329 R; 99/332; 99/337
[58] Field of Search ................. 49/403, 331, 332, 333, 49/337, 328, 329 R

[56] References Cited
U.S. PATENT DOCUMENTS

| | | | |
|---|---|---|---|
| 3,816,703 | 6/1974 | Binks | 219/440 |
| 3,894,483 | 7/1975 | Anetsberger et al. | 99/331 |
| 3,932,732 | 1/1976 | McAllister et al. | 235/92 |
| 3,973,481 | 8/1976 | Mies | 99/408 |
| 3,977,390 | 8/1976 | Fogel et al. | 126/374 |
| 3,979,056 | 9/1976 | Barnes | 99/333 X |
| 4,197,581 | 4/1980 | Watrous et al. | 364/400 |
| 4,217,482 | 8/1980 | Wadia | 99/329 R X |
| 4,278,872 | 7/1981 | Koether et al. | 219/497 |
| 4,282,423 | 8/1981 | Volz | 99/337 X |
| 4,320,285 | 3/1982 | Koether | 99/329 R X |
| 4,362,094 | 12/1982 | Polster | 99/342 |
| 4,429,892 | 2/1984 | Dutton | 236/78 |
| 4,437,159 | 3/1984 | Waugh | 364/400 |
| 4,503,320 | 3/1985 | Polster | 219/441 |
| 4,506,995 | 3/1985 | Polster | 374/57 |
| 4,549,527 | 10/1985 | Davis | 126/374 |
| 4,601,004 | 7/1986 | Holt et al. | 99/328 X |
| 4,623,544 | 11/1986 | Highnote | 99/331 X |
| 4,631,658 | 12/1986 | Easthill | 364/184 |
| 4,636,949 | 1/1987 | Longabaugh | 99/332 X |
| 4,688,475 | 8/1987 | Witt et al. | 99/325 |
| 4,740,888 | 4/1988 | Ceste, Sr. et al. | 364/187 |
| 4,742,455 | 5/1988 | Schreyer | 364/400 |

Primary Examiner—Stephen Marcus
Assistant Examiner—Christine A. Peterson
Attorney, Agent, or Firm—Banner, Birch, McKie & Beckett

[57] ABSTRACT

The present invention is directed to a computerized control system for use with a deep fat fryer to provide maximum operating flexibility to a user so that consistent food quality may be maintained and efficient and economical operation of the fryer may be realized.

38 Claims, 5 Drawing Sheets

DEEP FAT FRYER WITH COMPUTERIZED CONTROL SYSTEM

BACKGROUND OF THE INVENTION

1. Field of the Invention

This invention is directed generally to control systems and more specifically to programmable control systems for use with cooking systems such as deep fat fryers. Moreover, an embodiment of the invention is further directed to a programmable control system capable of storing cooking information for a plurality of food products to enable an operator to easily and consistently control the cooking operation of a deep fat fryer.

2. Description of the Prior Art

Typically, prior art deep fat fryers have a temperature probe, a heating element, which may be gas or electric for example, a temperature selector for enabling a user to select a desired cooking temperature for a particular food product and control means for controlling the heating element to be operated in different modes corresponding to the different stages of operation of a deep fat fryer. For example, there is often provided a melt mode wherein solid shortening or liquid shortening below a predetermined temperature is heated at a slow rate typically by pulsing the heating element until the liquid shortening is heated to a predetermined melt reference temperature. Typically, the heater would then be operated in a second mode wherein the temperature of the shortening is rapidly increased to a selected temperature at which cooking is to occur. While rapid increase of temperature to the selected temperature is desirable to minimize recovery time, if the temperature is raised too rapidly and/or turned off right at the selected temperature, the internal heat capacity stored in the system may cause the temperature to exceed the selected temperature. This undesirable phenomenon is known as overshoot.

In order to prevent overshoot, some prior art systems establish a temperature range, extending a predetermined number of degrees below the selected temperature, and operate the heating element in a full on mode up to this temperature range and then operate the heating element in a reduced power or pulsed mode once the temperature is within the established temperature range so that the rate of temperature increase is more precisely regulated and overshoot of the selected temperature is minimized. The effectiveness of providing this temperature range is dependent upon the temperature at which this pulse mode initiates since a tradeoff occurs between how rapidly the selected temperature can be reached and how effectively overshoot is minimized.

One major drawback with such an operating scheme is that typically the temperature range is fixed and generally can not be altered by the user. Under certain operating conditions, a user may desire faster recovery time and is willing to tolerate some chance of overshoot. Other times it may be desirable to forego the pulsed mode entirely and effectively provide thermostatic (on/off) control by setting the temperature range to zero. In other circumstances, the recovery time is less important than assuring that overshoot is minimized and a wider temperature range is preferable.

It would therefore be desirable to provide a temperature controller capable of being operated in a full on mode up to a first temperature and capable of being selectively operable in a pulse mode thereafter to bring the temperature up to the selected temperature wherein this first temperature is user selectable to provide more flexibility and enable a variety of user conditions to be taken into account to maximize product quality and consistency. For example, by selecting a first temperature near the selected temperature, faster recovery time can be obtained, that is the set point temperature can be reached in a shorter period of time since the heating element remains in a full on mode for a longer period of time. Conversely, if one wishes to minimize the chance of overshooting the set point temperature, the first temperature can be selected by the user to be substantially lower than the selected temperature thereby greater regulation of the shortening temperature can be obtained since the full on mode of the heating element is terminate well below the selected temperature. It would also be desirable to be able to effectively override the pulsed mode by providing a thermostatic on/off control so that no pulse mode occurs thereby providing faster recovery time but maximum potential for overshoot.

In some prior art systems that employ a pulsed mode as described above, this mode is typically entered directly and immediately after the full on mode. This is a drawback since, depending on operating conditions and system parameters, the pulsed mode might not be needed or desired. For example, if the temperature of the shortening is close enough to the selected temperature when the full on mode is terminated, then the internal heat capacity of the system may be capable of raising the temperature to the selected temperature. This results from the temperature rise due to the stored internal heat capacity of the system after the heating element is turned off. This thermal lag time can cause the temperature of the shortening to drift up to the set point temperature without the further application of heat such as by pulsing the heating element. Other systems do not provide any pulsed mode but rather calculate a temperature at which the heating element may be turned off such that when the heating element is turned off, the internal heat of the system will cause the cooking medium to drift up to the selected temperature. Due to various factors, precise control of the temperature of the cooking medium is not maintained.

It would therefore be desirable to cause a system to enter a wait mode between the termination of a full on mode and the initiation of the pulsed mode until a predetermined condition is met before any further control of the heating element is performed. This predetermined condition may be that the temperature rate of change is less than or equal to a predetermined value.

Some prior art systems operate such that once the selected temperature has been reached, the heating element is controlled to be periodically pulsed to maintain the temperature of the shortening at the selected temperature. Typically, these pulses have a fixed duty cycle. This is a drawback since different systems and operating conditions may require more or less pulses and frequent control of the heating element may be required to maintain the set temperature if frequent overshoot or undershoot occurs. It would be economical and efficient to minimize the number of times the heating element is pulsed and to minimize the extent to which and the number of times the selected temperature is exceeded by varying the duty cycle based on the past performance of the system.

To overcome this drawback, it would be desirable to provide correction pulses which effectively temporarily vary the duty cycle of the pulses to maintain at the selected temperature, avoid overcontrol of the heating element, avoid overshoot or undershoot and thereby provide efficient and economical operation of the heating element while maintaining the temperature at the selected temperature. Preferably, these adjustments would be based on the past history of the heat control operation for that system while operating in a maintain mode at a selected temperature for a selected product. For example, the duty cycle may be adjusted by a fixed or variable amount each time pulsing causes the temperature to exceed the selected temperature or fails to bring the temperature up to the selected temperature.

Another important consideration when using a deep fat fryer for cooking is the proper maintenance of the cooking medium. Specifically, if shortening is used, it is necessary to filter the shortening periodically to maintain cooking quality due to absorption of oils and odor from the cooked food products, and degradation of the shortening caused by breakdown thereof due to heat, extended use and other factors. The number of times a type of food product may be cooked in the same shortening before filtering is required varies from one food product to the next. For example, cooking french fries does not require the shortening to be filtered as often as is required with a breaded product, such as breaded fish. It has been found that cooking breaded fish in a deep fat fryer requires the shortening to be filtered more frequently due to various factors including the oil within the fish and the type of breading used. Other products, such as chicken require a filtration rate somewhere between french fries and fish.

Some prior art systems provide an indication that it is time to filter the shortening based on a count of the nuber of cook cycles, regardless of the type of food product being cooked. This may lead to filtration that is either too frequent or too infrequent based on the types of food cooked. It would therefore be desirable to provide an efficient and simple way to keep track of the number of times that different types of food products have been cooked and to provide an indication to the user when it is time to filter the cooking medium and thereby avoid under or over filtration of the cooking medium and further maintain the quality of the cooked product.

Another concern related to deep fat fryer cooking operations is how to deal with the situation that arises when a temporary power down condition causes an interruption of a cook cycle. One answer would be to just throw away any food that was in the process of being cooked when power down occurs. Obviously this is not a desirable alternative since it is a waste of food which is not socially or economically desirable. It would therefore be desirable to be able to continue a cook cycle that was interrupted due to a temporary power down condition if the quality of the food product can be maintained.

Another feature found in some prior art deep fat fryer systems is a load anticipation feature. Typically, the introduction of a food product into a cooking medium causes a temperature drop of the cooking medium. This phenomenon is sometimes referred to as "thermal shock." Usually, this termperature drop is not detected by the system immediately so that there is a time delay between the temperature drop due to thermal shock and the time the system recognizes and responds to the need for heat. Some prior art systems overcome this delay by turning on a heating element before the need for heat is realized by the system thereby "anticipating" the need for heat. It would however be desirable to allow a user the flexibility of selecting whether or not to use this load anticipation feature with each type of food product by programming load anticipation information into each cycle. Moreover, it would be a desirable safety feature to limit the temperature which the shortening can reach while using the load anticipation feature.

Some prior art systems cause the heating element to be controlled in an idle mode when a certain period of inactivity exists. This mode causes the cooking medium to be maintained at a temperature significantly below the selected temperature to avoid unnecessary breakdown of the cooking medium while assuring that a medium such as shortening remains in a liquid state and at a temperature that will enable satisfactory recovery time if the medium needs to be heated to the selected temperature for cooking. However, it would be desirable to provide a user with the options of selecting when and how the idle mode should be entered.

It would further be desirable to enable a computer controlled fryer to be able to store usage information so that a user may be provided with an indication of the number of times a particular cycle has been selected and the total number of times that all of the cycles have been selected.

SUMMARY OF THE INVENTION

In order to overcome these and other deficiencies and drawbacks of the prior art, it is an object of the present invention to provide a computer controlled deep fat fryer that provides maximum flexibility to a user to accommodate a broad range of needs and operating conditions.

Specifically, it is an object of the invention to provide a user selectable proportional control factor for controlling a heating element in a deep fat fryer whereby the proportional control factor varies a temperature at which a full on heating mode is terminated while raising the temperature of the shortening to a selected temperature.

It is a further object of this invention to operate a heat control in a wait mode between the termination of a full on heat mode and the commencement of a pulsed heat mode until a predetermined condition is met before further control of the heater occurs.

It is a further object of this invention to provide adjustment pulses to a heating element to maintain the temperature of the shortening at a selected temperature in an ecomonical and efficient manner by varying the on and off times of a heating element duty cycle.

It is a further object of this invention to provide a weighted cycle count to indicate when shortening in a deep fat fryer should be filtered based on the types of food products that have been cooked.

It is further object of this invention to enable a user to program pressure and alarm information for each interval.

It is a further object to enable a cooking operation to be continued under certain circumstances after a temporary power down condition.

It is a further object of this invention to provide a load anticipation feature with a user selectable safety limit.

It is a further object of this invention to allow a user to select how entry into an idle mode will occur.

It is a further object of this invention to provide a usage summary indication to a user.

In order to achieve these and other objects of the present invention, there is provided a computerized control system for controlling at least a heating element of a deep fat fryer to control the temperature of a cooking medium in the fryer. Moreover, the computerized control system is capable of performing other features which are advantageous in the use and operation of a deep fat fryer.

Specifically, there is provided a computerized control system for controlling the heating element of a deep fat fryer such that the heating element is controllable in a plurality of modes. In one mode, a melt operation may be performed wherein solid or liquid shortening placed within a vat of a deep fat fryer is heated by controlling the heating element to be operated in a pulsed mode. When the temperature of the shortening reaches a predetermined melt reference temperature, the melt mode is exited and the heating element is controlled to be in a full on mode to rapidly bring the temperature of the shortening up to a selected temperature. However, before the temperature reaches the preselected temperature, the full on mode may be terminated at a point which is a number of degrees below the selected temperature, wherein the number of degrees corresponds to a user selectable proportional control factor. The heating element may then be controlled to operate in wait mode. In the wait mode, the heating element is maintained in an off condition until a predetermined condition is met. This predetermined condition may be that the rate of change of temperature of the shortening within the fryer is less than or equal to a predetermined value, for example, zero. Once this predetermined condition is met, the wait mode is exited and depending on the relationship between the temperature of the shortening and the selected temperature when this mode is exited, the next mode of operation will be determined. For example, if the temperature of the shortening is a predetermined number of degrees less than the selected temperature when the predetermined condition is met, then additional heat will be provided by controlling the heating element to be in a full on mode. If when the predetermined condition is met, the temperature of the shortening is within a range of temperatures extending the predetermined number of degrees below the selected temperature, a maintain mode will be entered. If the temperature of the shortening is above the selected temperature when the predetermined condition is met, the heating element will not be operated until the temperature of the shortening falls below the selected temperature.

In the maintain mode, after the initial wait mode, when the temperature of the shortening is within the range of temperatures extending a predetermined number of degrees below the selected temperature, the heating element control will operate the heating element to be in a pulsed mode. Whenever the shortening temperature is below the predetermined range of temperatures, the heating element will be controlled to be in a full on mode to provide additional heat until the pot temperature is within the range.

Normally, the pulse mode is operated according to a preprogrammed duty cycle. That is, during the pulse mode the heater will be on for a predetermined period of time and off for a second predetermined period of time. However, according to an adaptive heat control feature of the present invention, each time the pulsing operation during the maintain mode causes the temperature of the shortening to overshoot the set temperature, a certain value is subtracted from the on time of the duty cycle such that there is decrease in on time. Similarly, each time the addition of pulses causes undershoot, that is, the addition of pulses does not bring the temperature of the shortening up to the set tmeperature, there is an increase in the on time. According to a preferred embodiment, and as will be described more fully below, each increase or decrease may be the addition or subtraction of a fixed number of seconds or fractions thereof, but based on the total number of times there is undershoot or overshoot, the total amount of pulse time correction will change. Furthermore, according to an adaptive memory feature of the system, this correction to the programmed duty cycle will be stored for a selected product as long as the same product is selected for the same selected temperature.

According to another feature of the present invention, a user may preprogram a plurality of cooking recipes for a plurality of food products and thereafter initiate a cooking process by merely selecting the desired product or recipe. The program information may include type of product, cooking times, selected temperatures, and pressure and alarm information. For example, to program a first cook cycle, a user may program a 350° set point temperature for a predetermined period of time during which the pressure is off and no alarm is programmed. The next cycle for that product may increase the temperature for a second period of time, turn the pressure on and provide an alarm at or near the end of the cook cycle.

According to another feature of the invention, the computer may store information regarding a cooking process already in progress when a power outage or temporary power down condition occurs. The computer will store in a nonvolatile random access memory, the remaining cooking time and the temperature of the shortening at the time of power down. When the power comes up again and normal operation can be continued, if the temperature of the shortening is a predetermined number of degrees below the current temperature, then the cook cycle will be aborted. If however, the temperature of the shortening is less than a predetermined number of degrees below the pot temperature when the power went down and a nonzero time is displayed for the remaining cooking time, then the cooking operation may continue from where it was when the power down condition occurred. It is advantageous to make a determination whether to abort or continue to cook based on how much the temperature has dropped since if the temperature has dropped too much, the food product may absorb too much shortening or it may take too long to return to the selected temperature whereby at the end of the cooking time the product may be of poor quality or not fully cooked. The amount of time that elapses during the temporary power down condition is not a reliable factor on which to base such a determination since sometimes the temperature may drop more slowly than other times.

According to another feature of the invention, there is a load anticipation feature programmable by a user for each product. Generally, when the load anticipation feature is selected, and cooking is about to begin as indicated by the user activating a timer switch, the heating element will immediately turn on until an increase in temperature is sensed. Normally, whenever a new cook cycle is started and food is dropped into the shortening, the temperature of the shortening drops significantly and a demand for heat is sensed and the heating element is operated to provide the necessary heat. However, there is usually some delay between the time a food product is dropped into the cooking medium and the time a temperature drop is sensed. Therefore, by anticipating this temperature drop, the selected temperature can be reached in a shorter period of time. For safety, the user may program for each selected product, a temperature, corresponding to a predetermined number of degrees above the selected temperature, above which the load anticipation feature will not operate.

According to another feature of the present invention, there may be an idle mode wherein the temperature of the shortening is maintained at reduced temperature to minimize degradation of the shortening while maintaining it in a liquid state and at a temperature that enables the selected temperature to be reached in a reasonable amount of time. This idle mode may be accessed in a plurality of ways. First, this mode may be entered manually by depressing an idle mode select switch. Additionally, there may be two ways of automatically accessing the idle mode. In a first automatic mode, if a predetermined period of time elapses since the last cooking cycle has terminated, then the idle mode will be entered. A second automatic mode may be used to enter idle when a predetermined amount of time has elapsed since the last product was selected. The option of at least two different automatic modes in combination with a manual entry into the idle mode provides user flexibility to accommodate the needs of various users and operating conditions. In operation, during the programming operation a user may program one of the automatic modes and the amount of time to cause into this idle mode.

According to another feature of the present invention there is provided a weighted cycle count to determine the optimal time to filter the shortening. Due to the variety of needs and conditions present for each user, it is preferable to allow a user to associate a weighting factor with each type of product whereby that factor relates to how many cycles of that product would have to be cooked, if only that product were cooked, before filtering would be necessary. In operation, each time a product cycle is selected, the weighting factor associated with that product contributes to a cumulative total to indicate to the user when it is time to filter the shortening.

According to another feature of the present invention, the computer control system may be accessed by authorized personnel to indicate a usage summary. This usage summary may provide an indication of the total number of times a type of food product was selected or cooked. Additionally, there may be a cumulative count which corresponds to the total number of times all food products were selected. Another advantageous aspect of this feature of the invention is that a user may clear a product count without clearing the cumulative count. This enables individual product counts to be cleared at the end of the day while the cumulative count of all food products selected or cooked for the week may continue to be stored.

DESCRIPTION OF THE PREFERRED EMBODIMENT

Figure 1:
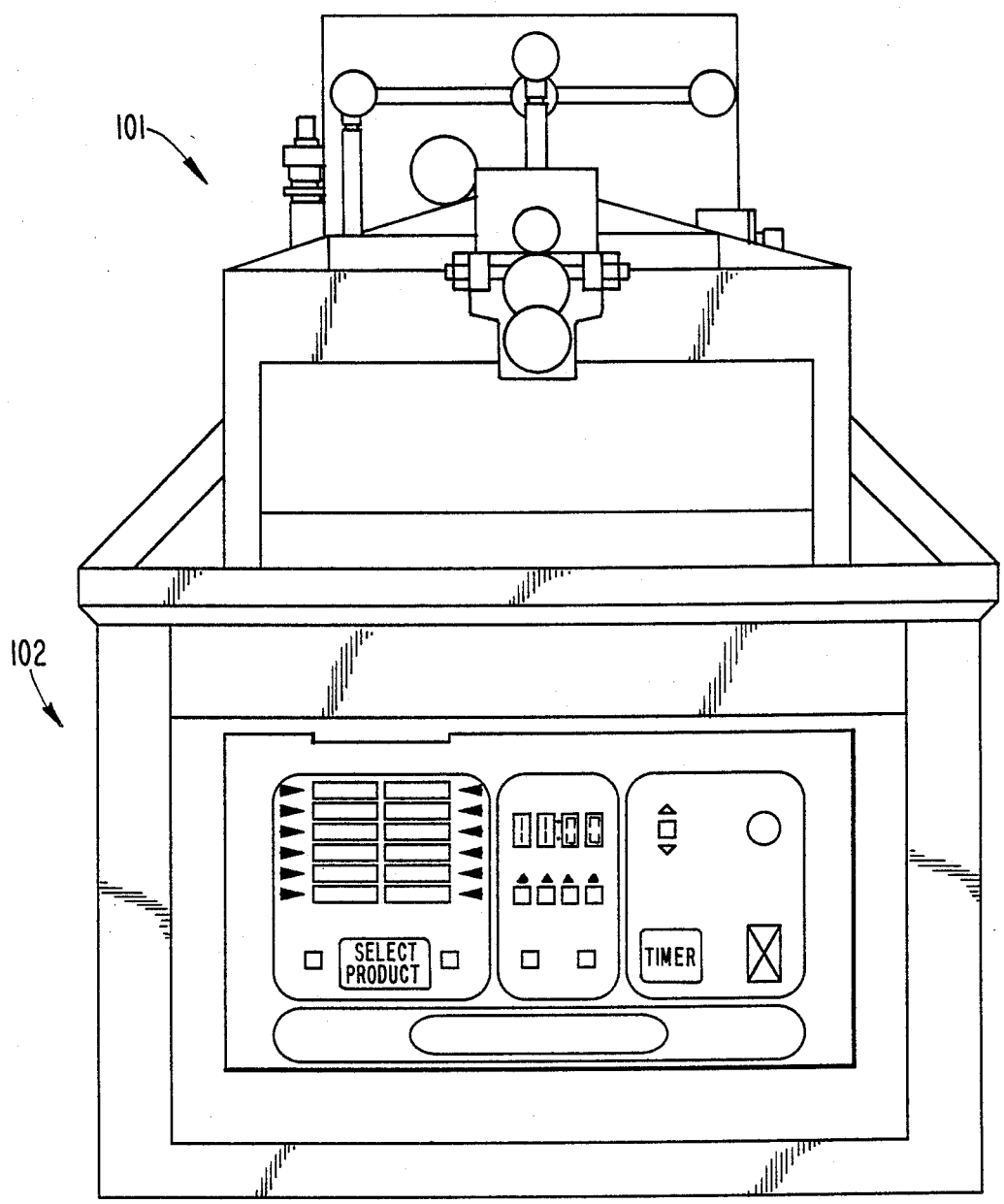
FIG. 1 is an overall perspective view of a fryer capable of use with the present invention.

The present invention is directed generally to control systems and is specifically directed to a programmable control system for controlling the operation of a deep fat fryer. Before describing the preferred embodiment it will be helpful to understand that as used herein, the terms pot and cooking vessel may be interchanged. Also, the terms selected temperature and set temperature and set point temperature may refer to the same user selectable temperature. Also, the terms cooking medium, shortening and fat may be used interchangeably. FIG. 1 shows the overall configuration of one type of fryer suitable for use with the computerize control of the present invention. It is to be understood that the computer control may be used with various other fryer configurations. Reference numeral 101 generally indicates the fryer including the cooking vessel and a lid and sealing mechanisms. Reference numeral 102 indicates generally a computer control console usable with the present invention.

Figure 2:
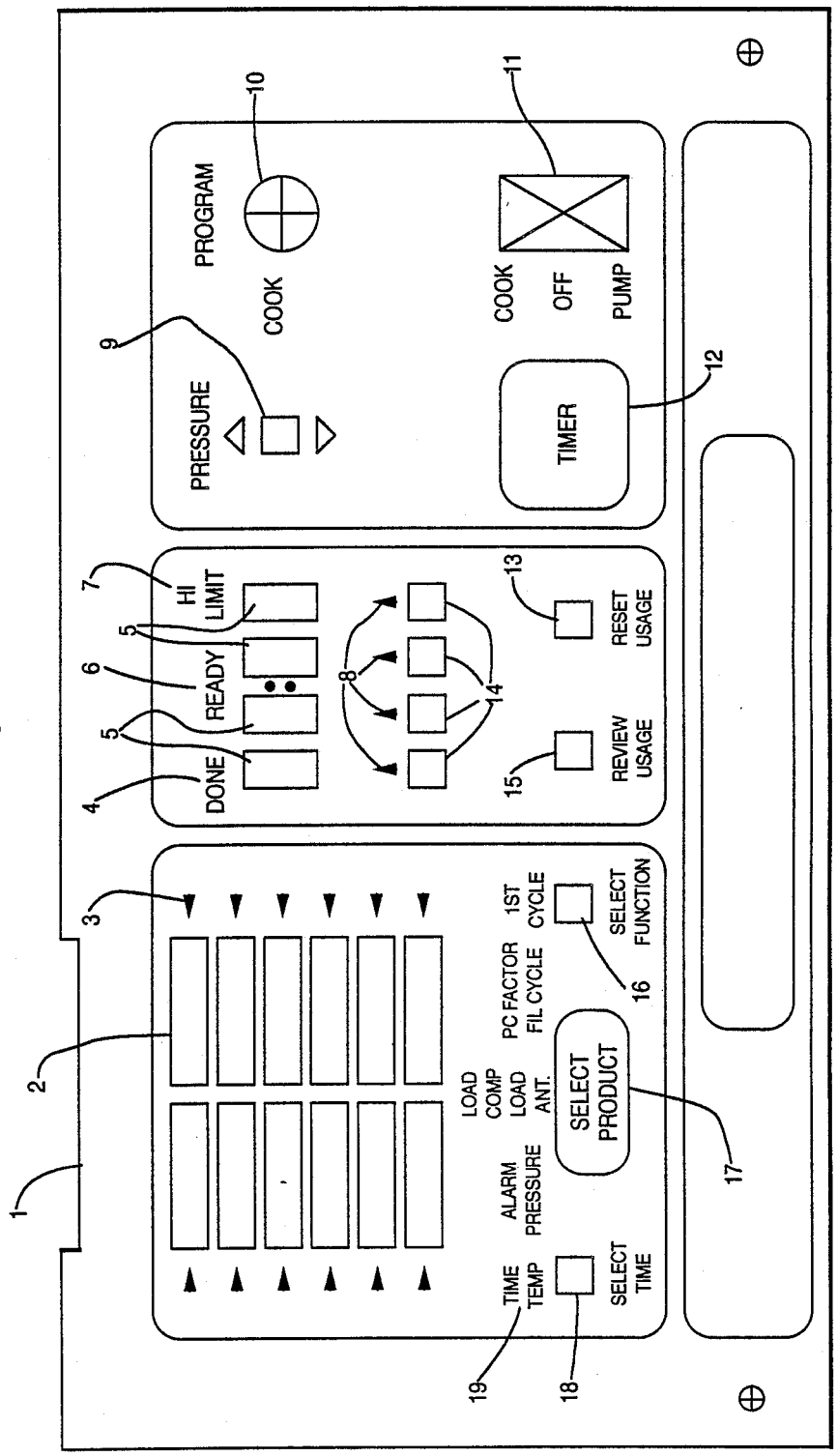
FIG. 2 is a detailed view of the control console for use with the present invention.

A more detailed view of the computer control console is shown in FIG. 2. With reference to FIG. 2, element 1 indicates a pressure sensitive membrane switch which activates the functions of the control.

Reference numeral 2 refers to the menu board display that displays the products that have been programmed within the control and may also be used to manually select operating modes such as idle mode or melt mode. The products that have been programmed correspond to cycles as will be discussed more fully below. Element 3 refers generally to the menu indicators, which when illuminated, point to the product cycle that the control is in. Each of the displays from element 2 may have an indicator associated therewith. These indicators may be LEDs or other suitable indicators. As shown there are 12 menu board displays and 12 indicators. It is to be understood that more or less or these elements may be used. Menu board display and indicators comprise a slide-in card behind a window, and 12 LED pointers. The slide-in card is used by the user to customize the cycle names, such that the user simply selects the desired cycle by name using SELECT PRODUCT. The last two positions on the card may be fixed as MELT and IDLE such that they cannot be changed or removed. The 12 LED indicators point to the cycle currently selected. Only one of these is on at a time in cook mode. The current cycle determines the cook times, temperatures, and pressures, as programmed into the control.

Reference numeral 4 refers to a DONE indicator which indicates to the operator that a cooking cycle is completed. This indicator turns on at the end of a cycle.

Reference numeral 5 indicates a digital display which may be a LED type display which displays the temperature of the shortening and the time remaining in a cook cycle. This display is used to show the cooking time, pot temperature, and error messages. It is a four-digit display, with a colon for time indication. In between cook cycles, the display will show the current pot temperature. If the temperature is below 170° F., the display will read "Lo". If the temperature is greater than 400° F., the display will read "Hi". The temperature units can be selected as degrees F. or degrees C. This may be present at the factory, but can be changed in the field. While the cooking timer is running, the display will show the remaining cook timer in minutes and seconds, separated by the colon. If there are any alarms during the cycle, the display will flash "AL x", where "x" is the alarm number. At the end of the cook cycle, the display will flash "00:00" and the buzzer will sound. If any of the change switches located under the display are pressed the pot temperature will be displayed. In process alarms as well as END-of-cycle alarms will override pot temperature display. Element 6 is a ready light which indicates the shortening has reached operating temperature and the operator may introduce the product into the shortening.

Reference numeral 7 indicates a high limit light which will illuminate in the event that the manual reset high limit has tripped. This indicates that the shortening temperature has exceeded the safe operating limit. According to a preferred embodiment, there is a high limit thermostat provided to shut down the system if an abnormally high temperature is achieved which may be due to control malfunction or other reasons.

Element 8 refers generally to change switch indicators which when illuminated show which part of the display is functional for programming such as increasing or decreasing temperature, time, etc.

Reference numeral 9 refers to a pressure light which when illuminated, shows that pressure is being used within the cooker. This display is used to show the current status of the pot pressure as it relates to the programmed pressure setpoint. The display consists of one indicator which is on when the pressure is on, off when the pressure is off. Element 10 refers generally to a key switch. When in the COOK position, the unit is in the normal operating mode and heating element control and cooking may take place. When the key is inserted into the key switch and rotated to th PROGRAM position, the unit is in the program mode and cooking parameters may be programmed. Reference numeral 11 refers to a power switch which in a preferred embodiment may be a sealed illuminated rocker-type switch. When in the COOK position, power is applied to the control. When in the PUMP position, power may be applied to a pump motor to cause a pumping operation in a manner known in the art. In the OFF position, the control is off.

Reference numeral 12 refers to a TIMER switch which may be used to start, stop, or abort a cooking cycle. Depending on the current state of the timer, the switch has the following effects:

| Condition | Effect |
| --- | --- |
| No timer running | Timer started |
| Timer running | Timer aborted |
| End-of-cycle alarm in progress | Timer reset |

Reference numeral 13 refers to a RESET USAGE switch which is capable of being operated in a program mode. This switch resets the total number of cycles that have been cooked either of one product or of all products as will be explained more fully below.

Reference numeral 14 generally refers to CHANGE switches which are usable in a program mode to change the value of a displayed number. The change may be an increasing or decreasing of the time of a cook cycle or increasing or decreasing of the temperature of a cook cycle.

Element 15 refers to a REVIEW USAGE switch capable of use in a program mode. By depressing this switch the display will show the number of cook cycles that have been cooked for a particular product or for all of the products. This feature will also be discussed more fully below.

Reference numeral 16 refers to a SELECT FUNCTION switch which is operable in a program mode. This switch will change the function that is being programmed such as time, temperature, alarm, etc.

Reference numeral 17 refers to a SELECT PRODUCT switch which enables an operator to select the product that is to be cooked or programmed. With this switch the operator selects the desired cycle or mode of operation of the control. Pushing the switch will select the next cycle. If the switch is held down for more than one second, the control will automatically continue to select the next cycle at about 2 cycles per second. Pressing the switch while the last cycle is selected will select idle mode. Pressing the switch while idle mode is selected will select melt, if possible. If a cycle is not programmed, then that cycle will be skipped during the cycle selection process. The control will not begin heat control until about one second after the cycle has been selected. This is to prevent rapid switching of the heat control on and off. The SELECT PRODUCT switch will not function while a cycle is timing.

Reference numeral 18 refers to the SELECT TIME switch which selects the interval within a product. As will be discussed more fully below in a preferred embodiment there may be 10 intervals per product or cycle.

Reference numeral 19 refers generally to a function display capable of use in a program mode. The function display indicates to the operator which function is being programmed.

Figure 3:
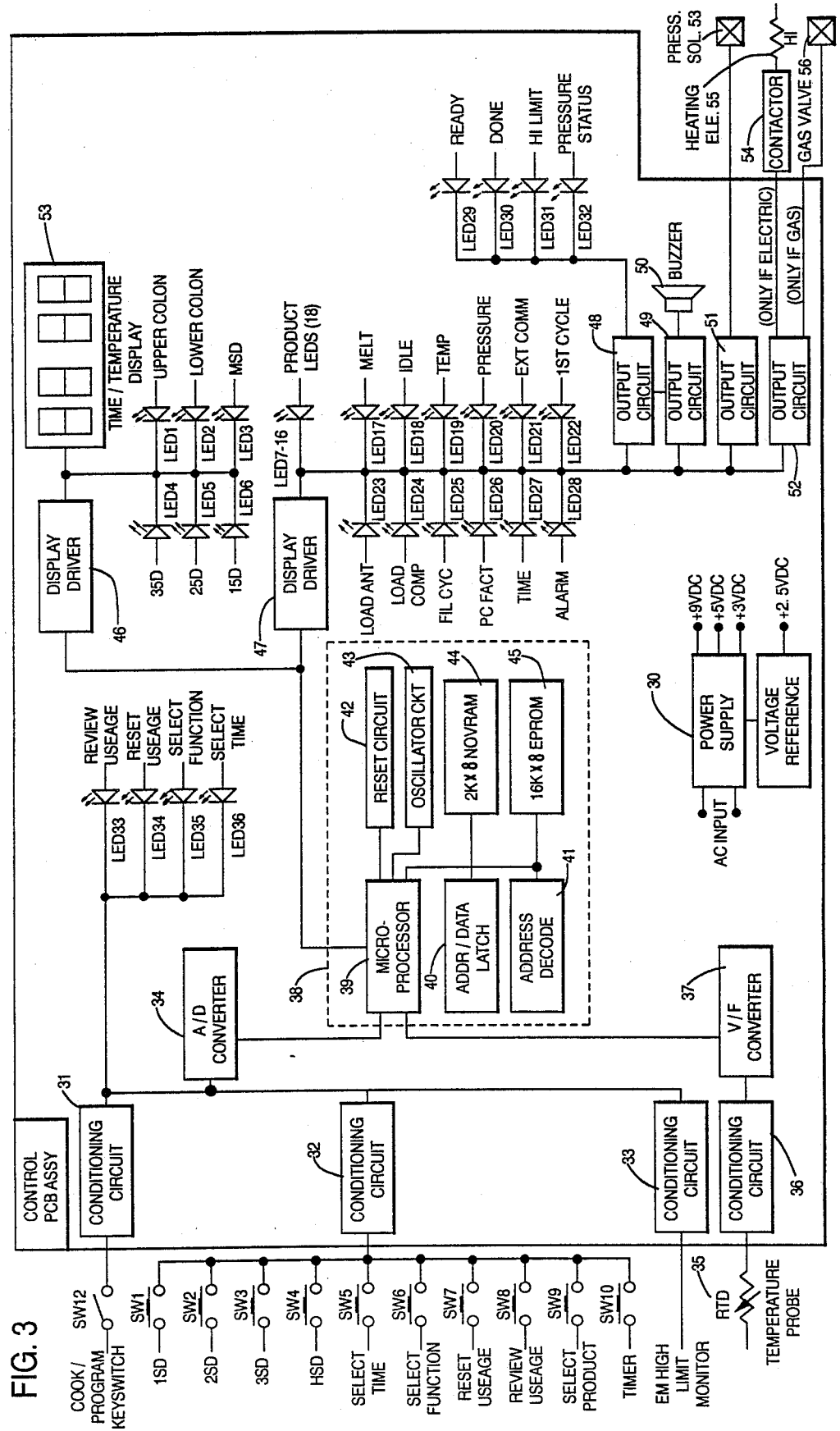
FIG. 3 is a circuit diagram for the control used in accordance with the present invention.

With reference to FIG. 3 there is shown a circuit diagram for the controller. It is to be understood that this circuit diagram is but one suitable embodiment for carrying out the present invention. It will be apparent to one of ordinary skill in the art that modifications to the shown embodiment can be effected without departing from the scope of the invention.

Element 30 refers generally to a power supply and voltage reference. The power supply may be a standard power supply with an AC input and may comprise adjustable and fixed voltage regulators to provide a plurality of output voltages for example 9, 5 and 3 volts DC. The voltage reference may comprise an integrated circuit voltage reference with a fixed output of 2.5 volts.

Conditioning circuit 31 receives an input from SW12 and the circuit may comprise a COOK/PROGRAM key switch conditioning circuit comprising a pull down resistor and four current limiting resistors for the REVIEW USAGE, RESET USAGE, SELECT FUNCTION, and SELECT TIME LED time bars (LEDs 33-36).

The membrane switch conditioning circuit 32 receives inputs from SW1-SW10 and the circuit may comprise a resistor ladder network made up of 8 resistors.

Electromechanical high limit monitor conditioning circuit 33 receives an input from a high limit monitor and may comprise two 1.5K dropping resistors, one H11AA1 optoisolator, a pull down resistor and a noise filter capacitor. The use of high limit circuits is known to one of ordinary skill in the art and will out be elaborated on here.

The A/D converter 34 comprises an ADC0811C IC converter and a bypass capacitor and receives inputs from conditioning circuits 31, 32 and 33.

The temperature probe 35 may comprise a 1000 ohm platinum thin film RTD and provides an input to its conditioning circuit 36 which may comprise a voltage divider and a capacitor for noise control. The output of conditioning circuit 36 provides an input to V/F converter 37 which may comprise an AD654 IC converter and resistor, potentiometer and capacitor to set the full scale output frequency. The converters 34 and 37 provide inputs to microprocessors 39 which is discussed below.

As indicated by the hatched box 38, the CPU core comprises an MC6803 microprocessor indicated as reference numeral 39, a 74LS373 address/data latch indicated by reference numeral 40, a 74LS139 one-of-four address decoder indicated by reference numeral 41, a reset circuit 42 an oscillator circuit 43 a 2K×8 NOV-RAM (48Z02) indicated by reference numeral 44 for storing cooking parameter data and a 16K×8 EPROM (27C128) indicated generally as 45 that contains the program for the control. One function of decoder 41 is to generate enable signals for elements 44 and 45.

Reset circuit 42 comprises two resistors forming a voltage divider of the 9-volt supply, an amplifier (in an LM224 quad op amp package) wired as a comparator, a MOSFET (VLN2222), a reset resistor and capacitor, and three diodes (1N914) and a resistor for switching the reset mode select voltages. Oscillator circuit 43 may comprise a 4.000 MHz crystal and two compensation capacitors. The operation of the CPU core will be readily apparent to one of ordinary skill in the art and will not be described here.

Display drivers 46 and 47 each comprise a MM5450 IC driver, and a resistor and capacitor to set output current limiting.

Output circuit 48 may comprise a 10K resistor DIP and a ULN2003 IC buffer. Output circuit 49 is a buzzer output circuit which may comprise a switching transistor (2N3904) three diodes to bias the transistor, and a diode (1N914) to increase the volume of the buzzer. Element 50 indicates a buzzer which may be used to indicate an alarm or provide other signals to an operator. Output circuits 51 and 52 comprise MOC3041 triac drivers, current limiting resistors, a MAC3040 triac, pull up resistors and a snubber network formed of a resistor and capacitor.

Display 53 is a time/temperature display in which the indicators correspond to element 5 of FIG. 2. The various LEDs (LED 1-LED 36) correspond to the displays and indicators described with respect to FIG. 2.

Output circuit 51, responsive to the operation of CPU 38, may be used to activate a pressure solenoid 53 to turn or turn off during the cook operation to selectively enable a user to cook with or without pressure. Output circuit 52 also responsive to CPU 38 may have two outputs one of which may be used if an electrical heating element is used and the other used if a gas heating element is used. With an electrical heating element, the output of output circuit 52 is used to control a contactor 54 which operates heating element 55. If a gas heating element is used, the output of output circuit 52 is used to control the operation of gas valve 56. The use herein of the terms heating element will be understood to cover either gas or electric heating elements unless otherwise specified.

The controller is operational in two basic modes of operation, a cook mode and a program mode. Within each of these two basic modes there are a plurality of operational modes in which the control may be operated.

In general, the cook mode is used for the actual cooking of the product. The heat control, idle and melt modes, and cooking timer functions are active in this mode. The program mode is used primarily for programming of the cycle parameters including the cook, melt, and idle mode parameters. To prevent unauthorized personnel from programming the control, key switch 10 may be provided such that the cook or program mode of operation can only be changed by use of a key given only to authorized personnel.

The programming operation may be performed for a variety of products. The details of the programming operation will be explained more fully below. Once the control has been programmed, the basic cook mode of operation is as follows. The fryer is turned on and the desired cook cycle is selected by depressing SELECT PRODUCT switch 17. The selected cycle is indicated by an LED 3 next to the cycle name. When the ready light 6 turns on, the fryer is ready to cook (the cooking medium temperature is near the selected temperature for the selected cycle). The operator then introduces the previously prepared food product into the cooking medium. TIMER switch 12 is depressed to start the cook cycle. Display 5 will indicate the time remaining until the end of the cycle. At the end of the cycle the DONE indicator 4 will flash, the display 5 will flash 00:00 and the buzzer 50 will sound. To turn the buzzer off, TIMER switch 12 may be depressed.

Having generally described the operation during the cook mode, a discussion will now turn to the three basic modes of heat control used during the cooking mode. These three modes include the melt, idle and cook modes. Each of these modes serves different functions during the operation of the fryer.

The melt mode is used to gradually heat solid shortening without applying too much heat thereby preventing scorching and other undesirable effects. The idle mode is used to reduce energy consumption during periods in which the fryer is not in use. The idle mode will keep the pot temperature high enough to ensure that the cooking temperature can be reached quickly and low enough to prevent unnecessary break down and degradation of the shortening due to constant high level heat. The cook mode is used to heat the cooking medium and actually cook the product.

As stated, the melt mode is responsible for safely melting solid shortening. However, it is to be understood that this mode may also be used with liquid shortening to extend the shortening life thereof by minimizing excessive temperatures. In this mode, the shortening is gradually heated to the desired temperature, such that excessive heat is not applied that would cause scorching, smoking or ignition. In a preferred embodiment, heating element 55 is pulsed during the melt mode such that the heating element is turned on for approximately 3 seconds then off for 27 seconds to accomplish this gradual heating. It will be obvious to one of ordinary skill in the art however, that depending on circumstances and system parameters, these times may be varied.

According to a versatile feature of the present invention, the operator can program the controller such that the melt mode is entered automatically or manually. Moreover, the operator can program the temperature at which the control will exit the melt mode. Also, the operator can program the first cycle that the control will select when the melt mode is exited.

It is to be understood that the terms operator or user refer to one who is actually opening or using the cooking system "in the field." When this specification refers to a user selectable parameter, it is to be understood that a user or operator can select parameters in the field, however, there may be preprogrammed parameters as well. These preprogrammed parameters may be set during manufacture of the control system.

The operation of the melt mode is as follows. When the fryer is turned on, the control checks the cooking medium temperature. If this temperature is below the melt temperature, and automatic melt (automelt) is enabled, the control enters the melt mode. If automelt is enabled and the temperature is above the melt temperature, then the control will select the programmed first cycle. When in the melt mode and the cooking medium temperature reaches the melt temperature, the control exits the melt mode and selects the programmed first cycle. If automelt is not enabled then melt can be exited (or entered) by pressing SELECT PRODUCT switch 17.

The idle mode is used to control the fryer at a lower than normal temperature to provide an energy saving feature and to conserve on the life of the shortening. This mode may also be considered a standby mode, as the idle temperature is usually programmed such that the cooking temperature can be reached quickly if necessary. The operator can program idle mode to be selected manually or automatically. If manual idle is programmed, the control will never automatically select idle. If automatic idle mode is programmed, the operator may select one of two types of idle. For convenience, these types may be called cycle idle and timer idle. The operator may program an idle temperature to determine the temperature that the shortening will be maintained at in the idle mode. If automatic idle (autoidle) is enabled, the operator programs an idle time to determine how much time must elapse before idle is automatically entered. The operator can always manually enter the idle mode by depressing SELECT PRODUCT switch 17. If autoidle is enabled, the control will select idle after the programmed time has elapsed. How this time is measured depends on whether cycle idle or timer idle has been selected.

Generally speaking, the operation of autoidle is effectively the starting of a software clock which acts like a cooking timer and when that clock counts down to zero, the control will select the idle mode. The type of idle selected will determine when this idle clock is started. In cycle idle, the clock is started every time a new cycle is selected. In timer idle, the clock is started at the end of every cook cycle. This idle clock may be preferably programmed from 0 to 255 minutes. However, it will be apparent that other timers may be used.

During the cook mode, the product is actually cooked. There are several operational features within the cook mode that comprise features of the present invention. One feature is the proportional control feature. This feature allows the control to regulate the pot temperature using a method known as proportional control. In essence, proportional control causes pulses of heat to be delivered to the pot to maintain tighter regulation of the pot temperature. This is in contrast to existing electromechanical thermostats which simply turn the heat on or off, depending on whether the pot temperature is above or below the set point. Since proportional control provides tighter temperature regulation at the expense of recovery time, the control can be programmed for varying degrees of proportional control. This allows maximum flexibility for a user. The proportional control is not used when actual cooking is taking place. During cooking, a simple on/off or thermostatic control may be used such that when the cooking medium temperature is below the selected temperature and a product is being cooked, the heating element is in a full on mode. When cooking is taking place and the cooking medium temperature is greater than the selected temperature, the heating element is off. Proportional control is used to control the heating element when the cooking medium is being heated to a selected temperature to prepare the system for cooking. Specifically, before the temperature reaches a preselected temperature, the full on mode may be terminated at a point which is a number of degrees below that temperature. The number of degrees below the temperature is selected by a user and corresponds to a proportional control factor.

According to a preferred embodiment, the proportional control factor may be selected as a number between 0 and 30. At the lowest level of proportional control, 0, the control acts like an existing thermostat, that is it does simple on/off thermostatic control. This provides the best possible recovery time since there is no pulsing and the selected temperature will be reached in the minimum amount of time. At the highest level, 30, according to the preferred embodiment, the best regulation is obtained since pulsing occurs at a maximum number of degrees below the set temperature. The trade off is that recovery time is increased. A proportional control factor may be programmed with each cycle. Since each cycle can be programmed with an individual proportional control factor, the desired temperature accuracy and recovery time can be tailored to each food product.

For clarity, it is to be understood that the use of the word cycle herein refers to the basic unit of product cooking control. By selecting a cycle, the user specifies the cooking times, temperatures, pressures and alarms for a selected product. Cycles may further be divided into intervals. An interval is a point in time, during the cooking cycle, at which an event occurs. This event could be a change in temperature or pressure, for example, or the occurrence of an alarm. It can also be any combination of the above items or other items. A further discussion of inervals will be presented below in connection with the programming operation.

Another feature of the present invention is pressure control. The pressure can be turned on or off for each interval. When turned on, regulation of the pressure may occur at about 12.0 psi. However it will be obvious to one of ordinary skill in the art that other pressures may be selected or the amount of pressure could be programmable for each cycle.

An interval alarm tells the user that it is time to do something during the cycle. For example, alarms can be programmed during open frying, i.e., frying wwith the lid open, to tell the operator to stir the product periodically. An alarm can be programmed a few minutes before the end of the cycle to alert the user that it will soon be time to remove the product. An alarm may consist of turning buzzer 50 on or off or providing any other type of indication to the user.

Another feature of the invention involves load compensation. Generally, load compensation is a technique for adjusting the cooking time to compensate for numerous variables in the cooking process including variances in product load size and temperature, and pot temperature. When load compensation is enabled, the control is continuously comparing the pot temperature to the set temperature during the cooking cycle. If the pot temperature is above the set point, then the control will shorten the cook time. If the pot temperature is below the set point, then the control will lengthen the cook time. Additionally, the greater the difference between the pot temperature and the set point, the greater the adjustment that is made. The amount of load compensation applied by the control may be programmable for each product by the user.

According to a preferred embodiment, this load compensation factor may be selected by the user to be a number from 0 to 10. A setting of 0 results in no load compensation while a setting of 10 results in maximum load compensation. It is to be understood that these numbers 0-10 represent a percentage of load compensation. It has been found preferable to have a maximum setting of 10 correspond to 100% load compensation.

The purpose of load compensation is to vary the cycle cooking time to deliver a constant time-temperature product to the load. The load compensation feature is effected by adjusing each displayed second on timer display 5 to reflect the difference between the current selected temperature and the actual pot temperature. For purposes of calculation, each displayed second is assumed to consist of 100 ticks of an internal clock. The actual time of each second is changed by adjusting the number of ticks in each displayed second according to the formula:

$$\text{TICKS} = 99 - [(\text{pot temp} - \text{set temp}) * L_C]$$

$L_C$ is a proportionally factor corresponding to a programmable load compensation factor. Pot temperature is the temperature of the cooking medium and set temperature is the selected temperature. If $L_C$ is 0, then no load compensation will be applied and the number of ticks of each displayed second will be 99. Since the internal software clock for each displayed second is checked for the 0 to −1 transition, each displayed second will equal exactly 1 real second when ticks equal 99. For example, if $L_C$ is 0.5 and the pot temperature is 8° below the set temperature, then the number of ticks of each displayed second will be 103 thereby extending the cooking time to compensate for the lower temperature.

The time, in ticks, of each displayed second is calculated at the beginning of each displayed second. For this reason, the load compensation is not adjusted at a constant rate but will be updated more quickly when the pot temperature is above the set point temperature.

Another feature of the present invention is load anticipation. In any cooking system, there is a lag between a large temperature drop, and the sensing of that drop by the control. Such a large temperature drop occurs, for example, when the load is first dropped into the shortening. This lag means that the heat will not turn on as soon as it should. The load anticipation feature of the present invention is a method of avoiding this lag. If load anticipation is enabled, then the control will turn the heating element on immediately when the timer is started. This will happen regardless of whether the initial pot temperature would normally cause the control to cause the heating element to provide heat. The heating element will remain on until a predetermined condition is met, e.g., the control senses that the temperature is increasing, at which point normal heat control will take over. In this way, the heating element is turned on in anticipation of a temperature drop to enable the shortening to reach the selected temperature as quickly as possible to maintain quality and consistency of the cooked food products.

In order to avoid deliberate or accidental abuse of this feature, it is desirable to limit th load anticipation in some way so that the temperature of the shortening does not exceed a safe temperature. This may be done by programming a temperature limit for the load anticipation that specifies the upper temperature at which load anticipation will occur.

For example, if a user programs 10° for the load anticipation factor and 390° for the selected temperature, then when the user selects that product and presses the timer to start the cooking operation, the heating element will turn on to heat the shortening unless the temperature of the shortening is above 400°. The load anticipation feature maintains the heating element in an on condition until it is detected that the temperature of the shortening is increasing. While this increase in temperature actually terminates the anticipation mode, the heating element may still be controlled to be in a full on mode if normal operation would require additional heat.

As discussed above, the proportional control feature of the present invention is used to control the heating element when the shortening is being heated to the selected temperature and is used to maintain that temperature. With reference to the state diagram of FIG. 4, it can be seen that there are various states including an initial heat-up (0), an initial cool-down (1), additional heat (2), adjustment (wait) (3), maintain (4), adjustment (extra pulses) (5), and stirling states (6). These states may be referred to by name or by the number associated therewith.

Figure 4:
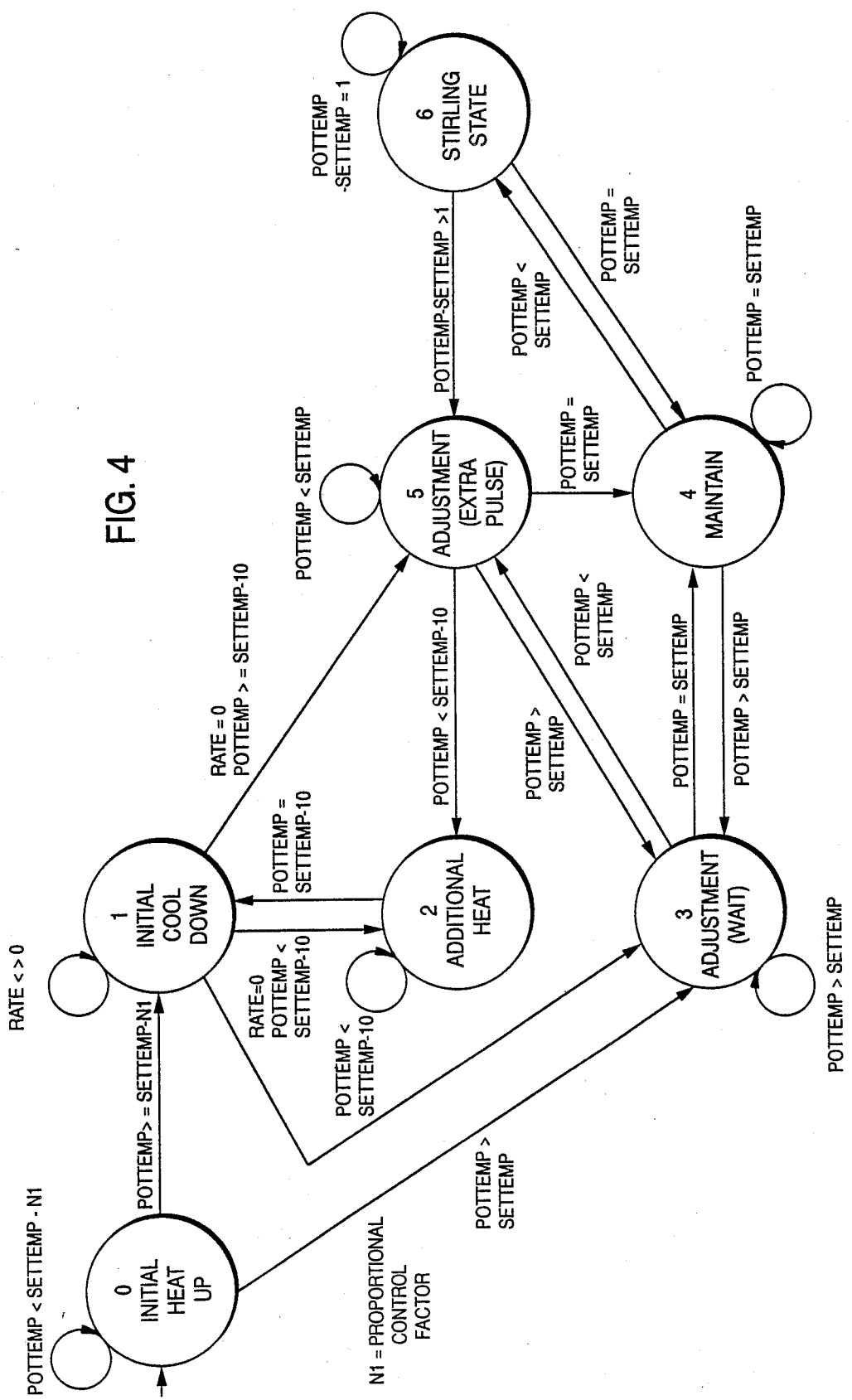
FIG. 4 is a state diagram indicating various states the heating element may be in during proportional control.

In FIG. 4, N1 represents a user selectable proportional control factor. POTTUP refers to the cooking medium temperature, SETTUP refers to the user selectable selected temperate and RATE refers to the rate of change of temperature of the cooking medium. Moreover, the use of the number 10 and 1 in the state diagram is for example only and it is to be understood that these are preprogrammed values. Other preprogrammed values may be chosen and used instead.

State 0, the initial heat-up state, is typically entered from the melt mode after the melt reference temperature has been exceeded or from the idle mode or when the fryer is initially turned on. During this initial heat-up state, the heating element is controlled to be in a full on mode to deliver maximum heat to the system. This mode continues until the pot temperature is greater than or equal to the selected temperatue minus a selected proportional control factor. As stated above, the proportional control factor is a number selected by the user and is programmed along with each cyele and represents the amount of proportional control desired considering the trade off between pot temperature regulation and recovery time. When the pot temperature is greater than or equal to the set temperature minus the proportonal control factor, state 1 the initial cool-down state, is entered. In this state, the heating element is controlled to be off. Even though the heating element is turned off, the internal heat capacity of the system continues to cause the temperature to increase. The control operation remains in this state until the occurrence of a predetermined condition. This condition may be that the temperature rate of change of the cooking medium becomes zero. Therefore, in this state, the temprature rate of change is detected and this state is maintained until a temperature rate of change is 0. When it is determined that the temperature rate of change has become 0, the next state entered will depend upon the relationship between the pot temperature and set temperature at that time. If when the rate of change of temperature in the pot equals 0, the pot temperature is greater than the set temperature, state 3, the adjustment (wait) state, will be entered. If when the rate of change equals 0, the pot temperature is less than the set temperature minus a predetermined value, state 2, the additional heat state, will be entered. This predetermined value may be preprogrammed to set a range extending from the set temperatue to a temperature some number of degrees below the set temperature. Preferably, this number may be 5-15. If when the rate of change of temperature equals 0, the pot temperature is greater than or equal to the set temperature minus the predetermined number, state 5, the adjustment (extra pulse) state, will be entered.

When the additional heat state is entered, the heating element is controlled to be in a full on mode. As stated, this mode may be entered when the rate of change of temperature equals 0 and the pot temperature is less than the set temperature minus a predetermined number, if the previous state was the initial cool-down state. The additional heat state may also be entered from state 5 if the pot temperature drops to less than the set temperature minus the predetermined number. In state 2, the additional heat state, heat is maintained in a full on mode as long as the pot temperature is less than the set temperature minus the predetermined number. Once the pot temperature rises to a temperature equal to the set temperature minus the predetermined number, this additional heat state is exited and the initial cool-down state is once again entered.

State 3, the adjustment (wait) state, is entered whenever the pot temperature is greater than the set temperature. In this state, the heating element is turned off. Entering this state also decreases the heat pulse ON time according to the adaptive heat control feature which will be discussed more fully below. The control will remain in state 3 until the pot temperature is equal to or less than the set point.

State 4, the maintain state, is used to maintain the pot temperature at the set point once it reaches the set point. The temperature is maintained by pulsing the heating element with a variable duty cycle. The total time of this cycle may be 30 seconds for example with the heater ON time being 3 seconds and the OFF time being 27 seconds. The pulse ON time of the cycle may be varied according to an adaptive heating control feature of the present invention. The initial pulse time is reset on power up and at each new cycle select. The initial pulse depends on the set point temperature for the selected product and whether gas or electric heating is used.

| Setpoint | Initial(electric) | Initial(gas) |
|---|---|---|
| 200 | 2.75 | 3.75 |
| 230 | 2.90 | 3.90 |
| 260 | 3.05 | 4.05 |
| 300 | 3.20 | 4.20 |
| 360 | 3.50 | 4.50 |
| 390 | 3.65 | 4.65 |

Note that initial pulse time for gas fryers is simply one second more than the initial pulse time for electric fryers. This initialization is performed so that the control willmore quickly zero in on the proper pulse time.

Each time the pot temperature exceeds the set temperature, the heat pulse ON time may be decreased by a predetermined number of seconds or fractions thereof, for example 0.08 seconds.

The control will remain in this state until the pot temperature is not equal to the set point temperature.

State 5, adjustment (extra pulse) corrects the pulse time by adding a predetermined number of seconds or fractions thereof to the ON time in an attempt to prevent the pot temperature from falling below the set temperature. This additional pulse time is in effect only during this state. For example, each time the pot temperature falls below the set temperature and state 5 is entered, 0.05 seconds may be added to the ON time.

State 6, the Stirling state, is a wait state that is entered from state 4 if the pot temperature drops below the set point temperature. The turbulence of the heated shortening causes short term temperature fluctuations that may or may not require the adjustment of the pulse ON time. State 6 delays that decision to adjust the pulse time until it is clear that the pot temperature has dropped a statistically significant amount below the set point, for example 1° F. State 5 will be entered in this case. If the pot temperature is just fluctuating in very small amounts about the set point and returns to the set point, the control returns to state 4.

Figure 5:
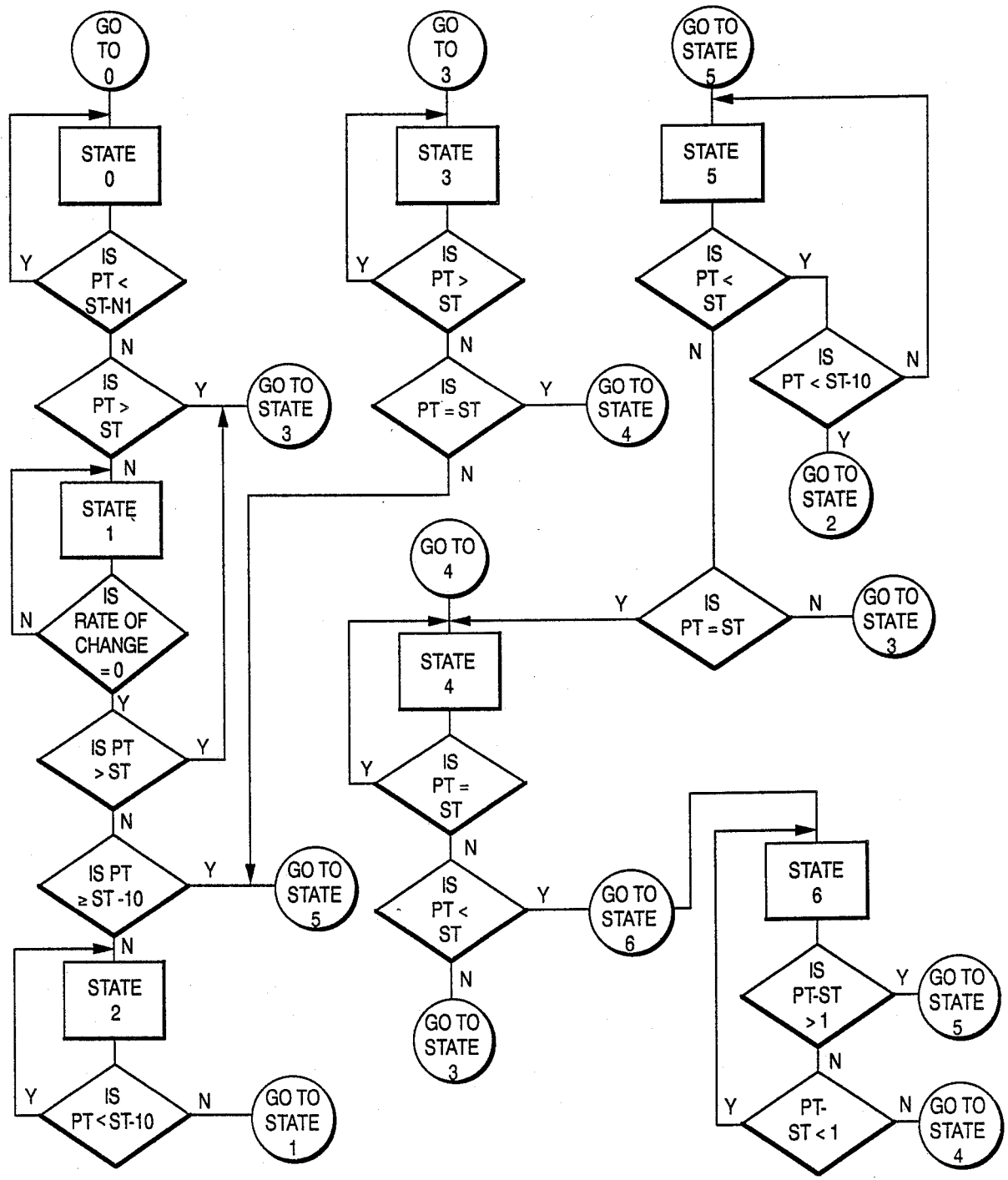
FIGS. 5 and 5A–5G are flow charts illustrating portions of this control program for determining the state of the heating element control.
Figure 5A:
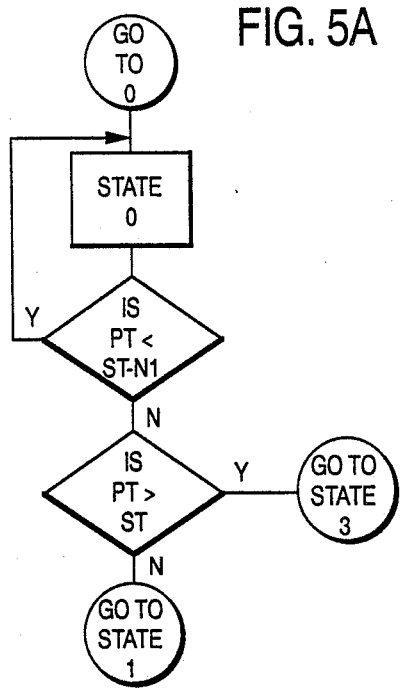
Figure 5B:
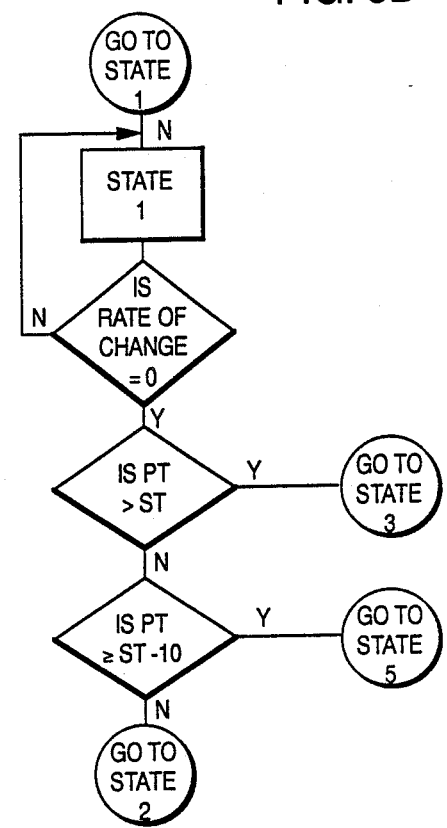
Figure 5C:
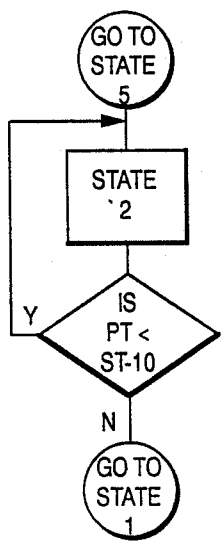
Figure 5D:
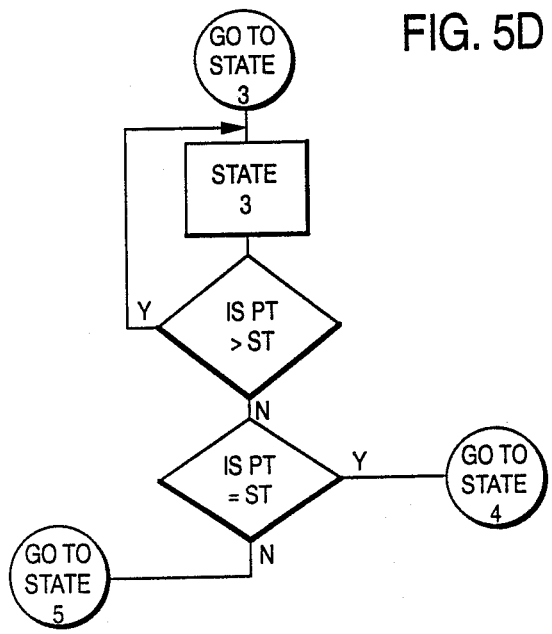
Figure 5E:
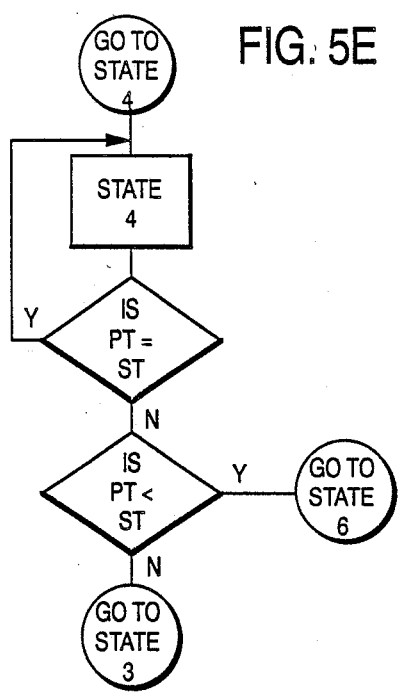
Figure 5F:
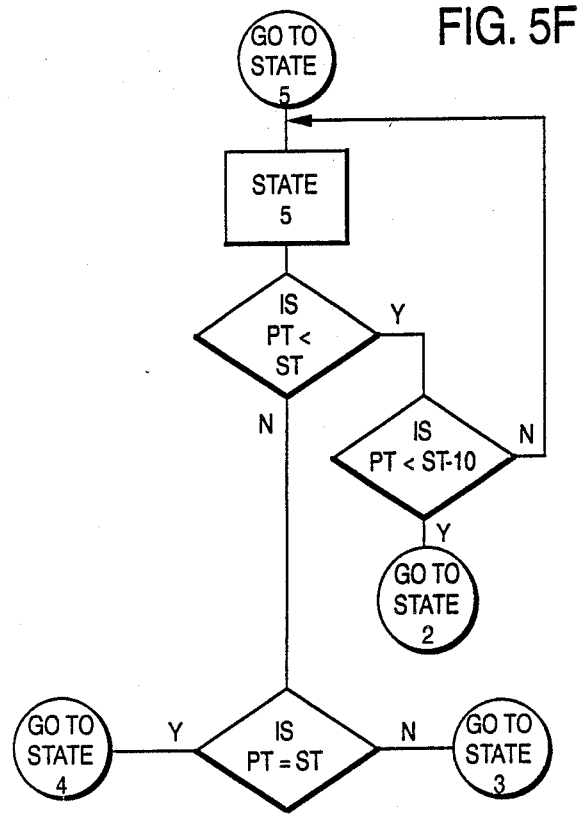
Figure 5G:
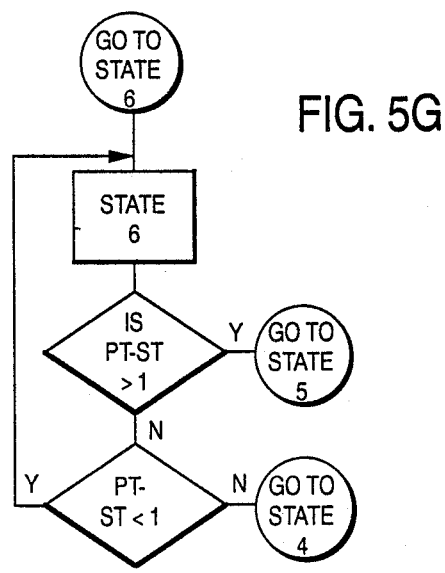

FIG. 5 is a flow chart which corresponds to a portion of the control program used in the proportional control routine. Since this is only a portion of it will be understood that this flow chart merely illustrates the decisions and controls the controller performs when in a particular state to determine the next state. A separate control program portion controls entry to and exit from this portion of the control routine.

With reference to the flow chart of FIG. 5, it is to be understood that theoretically any one of states 0, 1, 2, 3, 4, 5, or 6 may be entered initially. For clarity however it has been assumed that state 0 is entered first during the subroutine. However as indicated e.g. by the circles 501, 506, 512, 517, 522, 528 and 527, operating instruction may cause control to be operated in one of states 0, 1, 2, 3, 4, 5, or 6 respectively. These goto instructions may occur from other portions of the control program routine or from within this subroutine as will become apparent with the description below.

Once a state is entered, the control operation will remain in that state until a new state is entered or until the control program indicates that this proportional control subroutine is no longer to be implemented.

As used in this flow chart, PT refers to the pot temperature or cooking medium temperature. ST refers to the set temperature or selected temperature. N1 refers to the user selectable proportional control factor. The use of the number of 10, for example, (see decision block 514) or 1, for example, (see decision block 545) is for illustrative purposes only and the invention is not to be construed as being so limited. These values represent preprogrammed values which may be selected by the manufacture and used to preprogram the control system. Other values may be used.

Upon receiving a goto 0 instruction (501), the control operation operates in state 0 (502). If the pot temperature is less than the set temperature minus the proportional control factor, (503) then the operation of the control element remains in state 0. If the pot temperature is not less than the set temperature minus the proportional control factor then it is determined if the pot temperature is greater tha the set temperature (504). If the pot temperature is greater than the set temperature then a goto state 3 instruction (505) will be issued. If the pot temperature is not less than the set temperature then state 1 will be entered (507).

While the control operation is in state 1, it will be determined whether the rate of change of temperature in the cooking vessel equals 0 (508). If it is not, then the control operation will remain in state 1. If the rate of change of temperature in the cooking vessel is 0, then it will be determined whether the pot temperature is greater than the set temperature (509). If the pot temperature is greater than the set temperature then a goto state 3 instruction (505) will be issued. If the pot temperature is not greater is not greater than the set temperature, then it will be determined whether the pot temperature is greater than or equal to the set temperature minus a predetermined number for example 10 (510). If it is, then a goto state 5 instruction (511) will be issued. If not, state 2 will be entered (503).

While the control operation is in state 2, it will be determined whether the pot temperature is less than the set temperature minus the predetermined number 10 (514). If the pot temperature is less than the set temperature minus 10 then the control operation will remain in state 2. If it is not, then a goto state 1 instruction (516) will be issued. Whenever a goto state 3 instruction is received, the control operation will enter state 3 (518). While in state 3, it will be determined whether the pot temperature is greater than the set temperature (519). If it is, then the control operation will remain in state 3. If the pot temperature is not greater than the set temperature, it will be determined whether the pot temperature equals the set temperature (520). If the temperatures are equal, a goto state 4 instruction (521) will be issued. If the pot temperature is not equal to the set temperature, then a goto state 5 instruction (511) will be issued. When a goto state 4 instruction is received (521, 522, 548) the control operation will be in state 4 (523). While in state 4, it will be determined whether the pot temperature equals the set temperature (524). If these temperatures are equal, the control operation will remain in state 4. If the temperatures are not equal, it will be determined whether the pot temperature is less than the set temperature (525). If the pot temperature is less than the set temperature a goto state 6 instruction (527) will be issued. If not, a goto state 3 instruction (526) will be issued.

Whenever a goto state 5 instruction is received (511, 528, 546) state 5 will be entered (529). While in a state 5, it will be determined whether the pot temperature is less than the set temperature (530). If it is not, it will be determined whether the pot temperature equals the set temperature (542). If the pot temperature equal a set temperature, state 4 will be entered. If the pot temperature is not equal to the set temperature, a goto state 3 instruction will be issued (543). Returning to decision block 530, if the pot temperature is less than the set temperature while in state 5, it will be determined whether the pot temperature is less than the set temperature minus a predetermined number 10 (540). If the pot temperature is less than the set temperature minus 10, a goto state 2 instruction (541) will be issued. If the pot temperature is not less than the set temperature minus 10, then the control will remain in state 5.

Whenever a goto state 6 instruction is received, the control operation will be in state 6 (544). While in state 6, it will be determined whether the pot temperature minus the set temperature is greater than a predetermined value, for example 1 (545). If it is, then a goto state 5 instruction will issued (546). If the pot temperature minus the set temperature is not greater than 1, then it will be determined whether the pot temperature minus the set temperature is less than 1 (547). If the pot temperature minus the set temperature is not less than 1 a goto state 4 instruction will be issued (548). If the pot temperature minus the set temperature is less than 1, then the control will remain in state 6.

The weighted cycle count feature of the present invention is directed to a means of keeping track of when it is time to filter the shortening. Various types of food products and cooking cycles may be mixed or repeated and the control will determine that the shortening should be filtered based on which cycles have cooked, not just a total number of cycles. In order to use this feature of the control, it is necessary to program each cycle with a cycle count. This number is easy to determine and is user selectable based on prior experience etc. It is the number of cycles to cook before filtering, if only that cycle were cooked repeatedly. If this number is set to 0 for a cycle, then cooking that cycle will not contribute to the eventual filter indication. To determine that it is time to filter, the control adds the reciprocal of the cycle count to a running total at the end of each cook cycle. When the total approaches a predetermined number, e.g., 1, the filter indication is given.

An example of the weighted cycle count is as follows. Example. Suppose that the following cycle counts have been programmed for cycles 1–6.

| Cycle | Cycle count | Reciprocal of cycle count |
| --- | --- | --- |
| 1 | 2 | 0.500 |
| 2 | 1 | 1.000 |
| 3 | 4 | 0.250 |
| 4 | 3 | 0.333 |
| 5 | 10 | 0.010 |
| 6 | 0 | (not applicable) |

Example 1. If cycle 2 was used, this filter indication would be given immediately at the end of that cycle, since its cycle count is one. In addition, if cycle 2 is used after any other cycle(s), the filter indication will be give.

Example 2. If cycle 1 was cooked twice, the filter indication would be given, since $0.5 + 0.5 = 1$.

Example 3. The cooking sequence of cycles 3, 4, 10, 4, would give the filter indication, since $0.25 + 0.333 + 0.010 + 0.35 = 0.93$, which is close to 1. Exactly how close to 1 the count must be before the filter indication is given may be varied as well be apparent to one of ordinary skill in the art.

Example 4. If cycle 6 was cooked 20 times, this filter indication would not occur, because the cycle count is 0. This disables the counting of cycle 6.

Example 5. Suppose that, as in Example 3 above, the cycles 3 and 4 were cooked then the fryer was shut down for the day. The next day, cycles 10 and 4 were cooked. The filter indication would be given at this point. The control has remembered that cycles 3 and 4 were cooked the day before, but filtering was not done.

The implementation of this feature will be apparent to one of ordinary skill in the art.

Another feature of the present invention is the usage summary. This feature counts each cycle that is cooked and maintains a running total of all cycles. This feature will be discussed more fully herein below.

The programming mode of operation will now be described. The programming of the control refers to setting all the cook times, temperatures and other parameters. As a basic overview to the operation of the programming mode, the fryer is initially turned on, the key switch, if provided, is switched from a COOK to a PROGRAM position, the required programming (as will be described below) is performed and any changes made will be stored in the control's memory. When the programming is finished, the key switch, if provided, will be switched from the PROGRAM to the COOK position. The control will then be ready to cook.

The following is a description of the cycle programming. Before a cycle can be selected to cook a product, it must have at least one interval program. According to a preferred embodiment, after the key switch is turned to the program mode the first cycle will be selected by using SELECT PRODUCT switch 17. The first interval in this cycle is selected at this point using SELECT FUNCTION switch 16 to program the interval times, temperatures, pressures, alarms, etc., in a given interval. Change switches 14 located under the displays 5 may be used to change the displayed values. Next, SELECT TIME switch 18 may be used to program additional intervals. When the programming operation is finished, the program mode may be exited by using a key switch or SELECT PRODUCT switch to select another cycle to program. In addition to the above mentioned programming parameters, a proportional control factor, load compensation factor, load anticipation factor idle mode information and weighted cycle count may also be programmed for each cycle.

The load compensation factor may be programmed with a number from 0 to 10. 0 represents no load compensation and 10 is full available load compensation. The following table relates the programmed number to the percentage of load compensation in a preferred embodiment.

| Setting No. | Percent Load Compensation (%) |
|---|---|
| 0 | 0 |
| 1 | 9 |
| 2 | 17 |
| 3 | 25 |
| 4 | 33 |
| 5 | 42 |
| 6 | 50 |
| 7 | 85 |
| 8 | 90 |
| 9 | 95 |
| 10 | 100 |

The load anticipation value is programmed with a temperature limit above the set point at which load anticipation will not operate. It may be programmed from 0 to 10. Programming to 0 disables load anticipation.

The proportional control factor determines the degree of proportional control. The proportional control factor is programmable from 0 to 30. 0 is on/off (thermostat) control, and 30 is full proportional control. This enables a user to select the amount of proportional control desired considering the tradeoff between recovery time and overshoot.

The weighted cycle count can be programmed from 0 to 255. Programming the count to 0 removes this cycle from the weighted cycle count process. The number programmed is the number of loads to cook before giving the filter indication if only the current cycle were cooked.

In programming the idle mode the following parameters may be programmed. The programmed parameters may include the idle set point temperature, the automatic/manual idle selection, automatic idle time and type of automatic idle mode.

To program the melt parameters, the control is switched to program mode and melt is selected using all SELECT PRODUCT switch 17. The melt temperature, automatic or manual melt mode, and the cycle to enter on exiting the melt mode are programmed in the melt mode programming. Preferably, the melt temperature can be programmed from 170° to 390° F. The first cycle may also be programmed within the melt program. This is a cycle that the control will select, in cook mode, on exiting melt.

The usage summary feature provides a way of recording the number of times a cycle load was cooked in a given time period. This information is accessed in the program mode. To access the usage summary mode, the key switch is turned to the program mode, if not already in the program mode. Then REVIEW USAGE switch 15 is pressed. An indication of the number of times a complete load of cycle 1 was cooked will be shown on display 5. By pressing SELECT PRODUCT switch 17 the count for the other cycles may be viewed. Successively pressing SELECT PRODUCT 17 will show individual counts for the various cycles. When select product is pressed while the count is displaying the last cycle, the display will then show the total number of all cycles cooked. Any cycle count may be reset to 0, by pressing the RESET USAGE switch 13 while the desired cycle is selected. To reset the total in all cycle counts 0, RESET USAGE switch 13 may be pressed while the count for all cycles is displayed. To exit the usage summary mode, REVIEW USAGE switch 15 is pressed again. The control will then return to the PROGRAM mode as if it was just key switched into PROGRAM mode from COOK mode.

Each time a cook cycle is completed in COOK mode, the cycle count is increased by 1. Setting the total counts to 0 resets the total counts and the individual counts as well. However, resetting an individual cycle count to 0 does not reset or change the total count. This enables a running total to be kept.

According to another novel feature of the present invention, there may be provided a "boil mode." Typically, a user may clean the cooking vessel by filling it with an alakaline/water cleaning solution, then boiling this solution in the cooking vessel for a period of time. This time depends on the condition of the cooking vessel and the efficacy of the cleaning solution. The solution is then rinsed out of the cooking vessel. To implement this boil mode, when the control is in the idle or melt mode, a user may press TIMER SWITCH 12 which causes display 5 to display a "y" in the left-most display digit and an "n" in the right-most digit. The center two digits are blank. The control will wait for the operator to press either the left-most change switch 14 (under the "y") or the right most change switch 14 (under the "n").

If "y" is pressed, the control will regulate the pot temperature to be 195 degrees until the power to the control is turned off or the control is switched to the program kj mode.

If "n" is pressed, the control will return to the previous mode of operation.

The following is a list of variables and descriptions used in the assembly language computer program listing provided below. This portion of the overall computer program is directed to subroutines used during the heat control of the present invention.

VARIABLES AND DESCRIPTIONS

ADJ- 5/100 second adjustment to the permanent on time. This adjustment takes place when the pot temperature drops from the set point to 1 degree under the set point. It is a positive adjustment.

ADJ2- 25/100 second adjustment to the on time clock. For every degree under the set point-1 degree, this adjustment is added to the on clock.

ADJ3- 8/100 second adjustment to the permanent on time. This adjustment takes place when the pot temperature rises from the set point to 1 degree over the set point. It is a negative adjustment.

CYLNUM—the currently selected cycle number—1. If cycle 2 is selected the CYLNUM would be 1.

HSTATE—The current heat state. Please refer to the state transition diagram for the heat states and their associated numbers. (Example—State 0 is the initial heat up.)

MISLEAD2—BIT 6 of "MISLEAD2" is the heat contactor on/off BIT. When BIT 6 is 0 the contacts are off and when it is 1 they are on.

MPOFF—(AND MPOFF+1) Two byte clock used for the timing of the off period of the contacts while heating. It is normally initialized to 25 seconds.

MPOFTI—40 second constant off time. Placed in off clock when initialized or re-initialized.

MPON—(AND MPON+1) Two byte clock used for the timing of the on period of the contacts while heating.

MSFLG4—[BIT 0]: Used for the on clock status BIT (0—running, 1—not running). [BIT 1]: Used for the off clock status BIT (0—running, 1—not running).

N1—Storage place for the currently selected cycle's proportional control values (can be set from 0 to 10).

OLDPOT—The pot temperature saved the last time through the PID control code.

PCFACT—The 10 byte area used to store the proportional control values.

POTTMP—The current pot temperature.

RATCLK—(AND RATCLK+1) A two byte clock used to check the rise rate of the pot temperature.

SAVEB—Variable passed to a subtraction routine. In the PID control code, "SETTMP" (the current set point temperature) is passed.

SETTMP—The current cycle's interval set point temperature.

SUBANS—The result of the subtraction routine. In the PID control code the "SUBANS" is the difference between the pot temperature and the set point temperature.

SWTMON—Switch ladder monitor byte. Contains the number of the current switch ladder switch pressed and whether or not is a new switch transition. (BIT 8—Transition BIT, 0—no transition, 1—transition. BITS 0 through 7—number of the current selected switch ladder switch. [0 is no switch]).

TIMERSTA—Timer control and status register byte. In the PID control code, used to disable and enable the timer interrupt compare flag.

TON—(AND TON+1) The current permanent contactor on time. This changes based on transitions from set point to above set point and setpoint to below set point.

The following portions of the program listing are a copyright of Henny Penny Corporation. All rights are reserved.

```
*********************************************************************************
* SUBTRC
* SUBROUTINE TO HANDLE POTTMP/ SETTMP RATIO FINDING
*
*       I/O:      INPUTS:    SAVEB,POTTMP
*                 OUTPUTS:   SUBANS
*
*       ERROR HANDLING:              NONE
*       OTHER ROUTINES CALLED:       NONE
*       MACHINE EXIT STATE:          ACCUM. A - CONTAINS SUBANS
*                                    ACCUM. B, X-REG - UNCHANGED
*                                    CCR - INDETERMINATE
*
*       CREATE DATE:
*       REVISION DATE:
*       REVISION LEVEL:      A
*       REVISION RECORD:     A - ORIGINAL
*********************************************************************************

* DO SETTMP - POTTMP SUBTRACTION

0000                   SUBTRC: LDAA  SAVEB
0000  B6 00 00                 EORA  POTTMP          ;CHECK FOR TSET=TPOT
0003  B8 00 00                 BNE   PLSMIN          ;IF NOT DO BOTH + OR BOTH - TEST
0006  26 05                    CLR   SUBANS
0008  7F 00 00                 BRA   SUBTEN          ;GO AND CHECK FOR NEGATIVE ANSWER
000B  20 37

* DO COMPARISON TO FIND IF BOTH POSITIVE (OR NEGATIVE) OR UNALIKE

000D                   PLSMIN: BMI   ONENEG          ;THEY ARE UNALIKE
000D  2B 0A                    LDAA  SAVEB
000F  B6 00 00                 CMPA  POTTMP
0012  B1 00 00                 BPL   STGNPT          ;SET TEMP. > POT TEMP.
0015  2A 1B                    BRA   PTGNST          ;...ELSE POT TEMP. > SET TEMP.
0017  20 05

* DO ONE NEGATIVE ROUTINE

0019                   ONENEG: LDAA  SAVER           ;IS THE SET TEMP NEGATIVE
0019  B6 00 00                 BMI   STGNPT          ;...YES, DO THAT ROUTINE
001C  2B 14

* POT TEMP. > SET TEMP SUBTRACTION

001E                   PTGNST: LDAA  SAVER
001E  B6 00 00                 SUBA  POTTMP
0021  B0 00 00                 BPL   UFL             ;IF SET TEMP. - POT TEMP. > 0 THEN UNDERFLOW
0024  2A 05                    STAA  SUBANS          ;ELSE STORE IT AND END
0026  B7 00 00                 BRA   SUBTEN
0029  20 19

0028                   UFL:    LDAA  #-128D
0028  B6 00                    STAA  SUBANS          ;SHOW NEGATIVE AND END
002D  B7 00 00                 BRA   SUBTEN
0030  20 12

* DO SET TEMP. > POT TEMP SUBTRACTION

0032                   STGNPT: LDAA  SAVER
0032  B6 00 00                 SUBA  POTTMP
0035  B0 00 00                 BMI   OFL             ;OVERFLOW CONDITION
0038  2B 05                    STAA  SUBANS          ;ELSE STORE ANSWER
003A  B7 00 00                 BRA   SUBTEN          ;AND THEN GO AND CHECK FOR A NEGATIVE ANSWER
003D  20 05

* OVERFLOW

003F                   OFL:    LDAA  #127D
003F  B6 7F
```

```
154  0041   K7 00 00      STAA    SUBANS
155  0044                 RTS
156          39    SUBTEN:
157                       PAGE

2500 A.D. 6801 CROSS ASSEMBLER   -   VERSION 3.01c

INPUT FILENAME  :  PIDCTL.SOR
OUTPUT FILENAME :  PIDCTL.ORJ

LIST    ON
                  MACLIST OFF
    0000          TITLE   FMMAX CYCLE IDLE PID CONTROL ROUTINES

1               EXTERNAL    RATCLK,MPON,MPOFF,N1,N2,NSTATE,TON,MSFLG4
  2               EXTERNAL    POTTMP,SETTMP,OLDPOT,MISLED2,FCFACT,CYL.NUM
  3               EXTERNAL    SWTMON,DISTIM,TIMDIS,KEYIN,SUBTRC,SUBANS,CYLFLG
  4               EXTERNAL    TIMERSTA,SAVEB
  5
  6               GLOBAL      PROPOR
  7
  8               PAGE
  9  ***********************************************************************
 10  *  RATE0
 11  *  MACRO TO CHECK FOR A 0 RATE IN THE HEATING SYSTEM
 12  *  (0 RATE MEANS NO TEMP DIFFERENCE FOR AT LEAST 4 SECONDS)
 13  *
 14  *  I/O:   INPUTS:   RATCLK,POTTMP,OLDPOT
 15  *         OUTPUTS:  OLDPOT,MSFLG4,RATCLK
 16  *
 17  *  ERROR HANDLING:        NONE
 18  *  OTHER ROUTINES CALLED: NONE
 19  *  MACHINE EXIT STATE:    ACCUM. A,ACCUM. B,CCR - INDETERMINATE
 20  *                         X-REG. - UNCHANGED
 21  *
 22  *  CREATE DATE:
 23  *  REVISION DATE:
 24  *  REVISION LEVEL:        A
 25  *  REVISION RECORD:       A - ORIGINAL
 26  ***********************************************************************
 27  *  IS THE OLD POT TEMP = THE CURRENT POT TEMP
 28
 29  RATE0: MACRO
 30
 31          LDAA    OLDPOT
 32          CMPA    POTTMP
 33          BNE     RESKAT          ;IF NOT RESTART THE RATE CLOCK AND MAKE OLDPOT=POTTMP
 34
 35  *  IS THE CLOCK > 4 SECONDS
 36
 37          LDAA    RATCLK+1
 38          CMPA    #4D
 39          BLO     RANOT0          ;IF NOT MAKE RATE <>0
 40
 41  *  SHOW RATE = 0 AND END
 42
 43          CLRB
 44          BRA     RAT0EN
```

```
51  * RESET THE RATE CLOCK AND MAKE THE POT TEMP
52
53  RESRAT: CLR    RATCLK
54          CLR    RATCLK+1
55          LDAA   MSFLG4
56          ANDA   #$FB
57          STAA   MSFLG4
58
59  * MAKE THE OLD POT TEMP = CURRENT POT TEMP
60
61          LDAA   POTTMP
62          STAA   OLDPOT
63
64  * SHOW THE RATE <> 0
65
66  RANOT0: LDAR   #$FF
67
68  * END THE 0 RATE CHECKING ROUTINE
69
70  RAT0EN: ENDM
71          PAGE
72  *************************************************************
73  * STMPOF
74  * MACRO TO RESET AND RESTART THE MPOFF (MAINTAIN PULSE OFF TIME) CLOCK
75  *
76  * I/O:    INPUTS:  MSFLG4
77  *         OUTPUTS: MSFLG4,MPOFF,MPOFF+1
78  *
79  * ERROR HANDLING:         NONE
80  * OTHER ROUTINES CALLED:  NONE
81  * MACHINE EXIT STATE:     ACCUM A., CCR - INDETERMINATE
82  *                         ACCUM B., X-REG - UNCHANGED
83  *
84  * CREATE DATE:
85  * REVISION DATE:
86  * REVISION LEVEL:    A
87  * REVISION RECORD:   A - ORIGINAL
88  *************************************************************
89
90  MPOFTI FCB    $28       ;40 SECONDS OFF TIME
91
92  * RESET AND RESTART THE MPOFF CLOCK
93
94  STMPOF: MACRO
95
96          LDAA   MPOFTI
97          STAA   MPOFF+1
98          CLR    MPOFF
99          LDAA   MSFLG4
100         ANDA   #$FD
101         STAA   MSFLG4
102
103 * END THE MACRO
104
105         ENDM
106         PAGE
107 *************************************************************
108 * DOTONP
109 * MACRO TO ADJUST THE T-ON TIME POSITIVELY
110 *
111 * I/O:    INPUTS:  TON
112 *         OUTPUTS: TON,TON+1
113 *
114 * ERROR HANDLING:         NONE
115 * OTHER ROUTINES CALLED:  NONE
```

```
117  * MACHINE EXIT STATE:         ACCUM. A, CCR - INDETERMINATE
118  *                             ACCUM. B, X-REG. - UNCHANGED
119  *
120  *
121  *  CREATE DATE:
122  *  REVISION DATE:
123  *  REVISION LEVEL:           A
124  *  REVISION RECORD:          A - ORIGINAL
125  ***********************************************************************
126
127  ADJ      FCB      $05      0001 05    ;ADJUST CONSTANT, 5/100 SECOND
128  ADJ2     FCB      $19      0002 19    ;ADJUST CONSTANT, 25/100 SECOND
129  ADJ3     FCB      $00      0003 00    ;ADJUST CONSTANT, 0/100 SECOND
130
131  * ADD CONSTANT TO TON
132
133  DOTONP: MACRO
134
135           LDAA     TON
136           ADDA     ADJ
137           CMPA     #100D
138           BLO      TONPEN$             ;IF RESULT OF ADDITION DOES NOT CAUSE 100TH SECOND OVERFLOW THEN END
139           SUBA     #100D
140           STAA     TON
141
142  * RESULT CAUSED > 100/100THS, INCREMENT TON+1
143
144           INC      TON+1
145           LDAA     TON+1
146           CMPA     #5D
147           BLO      DAPEND$             ;ALLOW MAXIMUM OF 5 SECONDS ON TIME
148           LDAA     #5D
149           STAA     TON+1
150           CLR      TON
151           BRA      DAPEND$
152
153  * END THE MACRO
154
155  TONPEN$:STAA      TON
156  DAPEND$:ENDM
157           PAGE
158  ***********************************************************************
159  *  DOTONM
160  *  MACRO TO ADJUST THE T-ON TIME NEGATIVELY
161  *
162  *  I/O:         INPUTS:     TON,TON+1
163  *               OUTPUTS:    TON,TON+1
164  *
165  *  ERROR HANDLING:          NONE
166  *  OTHER ROUTINES CALLED:   NONE
167  *  MACHINE EXIT STATE:      ACCUM. A, CCR - INDETERMINATE
168  *                           ACCUM. B, X-REG. - UNCHANGED
169  *
170  *  CREATE DATE:
171  *  REVISION DATE:
172  *  REVISION LEVEL:          A
173  *  REVISION RECORD:         A - ORIGINAL
174  ***********************************************************************
175
176  * SUBTRACT .08 SECONDS FROM THE T-ON TIME
177
178  DOTONM: MACRO
179
180           LDAA     TON
181           SUBA     ADJ3
```

```
        BCC     TONHEN$             ;IF NO CARRY THEN END
* RESULT OF SUBTRACTION CAUSED CARRY, ADJUST TIME ACCORDINGLY

ADDA    #100D
            STAA    TON
            DEC     TON+1
            BRA     DNAEND$

* END THE ROUTINE

TONHEN$:STAA    TON
DNAEND$:ENDM
        PAGE
*******************************************************************************
* GETN1
* MACRO TO GET THE CURRENT PROPORTIONAL CONTROL FACTOR
*
*   I/O:        INPUTS:  #PCFACT,CYLNUM
*               OUTPUTS: N1
*
*   ERROR HANDLING:         NONE
*   OTHER ROUTINES CALLED:  NONE
*   MACHINE EXIT STATE:     ACCUM. A, ACCUM. B, X-REG. CCR - INDETERMINATE
*
*   CREATE DATE:
*   REVISION DATE:
*   REVISION LEVEL:         A
*   REVISION RECORD:        A - ORIGINAL
*******************************************************************************
* GET THE CURRENT PROPORTIONAL CONTROL FACTOR

GETN1:  MACRO

LDX     #PCFACT
            LDAB    CYLNUM
            ABX
            LDAA    #0,X
            STAA    N1              ;SAVE IT IN OUR VARIABLE

* END THE MACRO

ENDM
            PAGE
*******************************************************************************
* NSFIND
* MACRO TO FIND THE NEXT STATE FROM THE CURRENT PID HEAT STATE
*
*   I/O:        INPUTS:  HSTATE,FOTTMP,SETTMP,MSFLG4,N1
*               OUTPUTS: MSFLG4,HSTATE
*
*   ERROR HANDLING:         NONE
*   OTHER ROUTINES CALLED:  GETN1,DOTONP,DOTONM,STMPOF
*   MACHINE EXIT STATE:     ACCUM. A, ACCUM. B, X-REG., CCR - INDETERMINATE
*
*   CREATE DATE:
*   REVISION DATE:
*   REVISION LEVEL:         A
*   REVISION RECORD:        A - ORIGINAL
*******************************************************************************
* GET THE CURRENT PROPORTIONAL CONTROL FACTOR

NSFIND: MACRO
```

```
            GETN1

* IS THE CURRENT STATE = 0 (THU) ?

LDAA    HSTATE
        BNE     HSTAT1          ;IF NOT SEE IF THE CURRENT STATE IS 1

* CHECK TO SEE IF THE POTTMP IS LOW

LDAA    POTTMP
        CMPA    #254D           ;SEE IF IT IS A LOW
        BEQ     SETST0          ;IF SO KEEP IT STATE 0

* IS THE ANSWER NEGATIVE

LDAA    SURANS
        BPL     VALCZK          ;IF NOT THEN JUST CHECK THE VALUE
STAIST: LDAA    #3D
        STAA    HSTATE          ;IF POTTMP > SETTMP MAKE STATE = 3
        JMP     NSFEND          ;THEN END

* CHECK THE VALUE OF ANSWER (SUBTRACT N1 FROM IT)

VALCZK: SUBA    #1D
        SUBA    N1
        BPL     SETST0          ;IF POTTMP < SETTMP - N1 STATE = 0
        LDAA    #1D             ;ELSE STATE = 1
        STAA    HSTATE
        JMP     NSFEND
SETST0: CLR     HSTATE          ;ELSE MAKE IT 0
        JMP     NSFEND          ;THEN END

* IS THE CURRENT STATE = 1 ?

HSTAT1: CMPA    #1D
        JNE     HSTAT2          ;IF NOT SEE IF THE STATE=2 (ADH)

* ELSE CHECK FOR A 0 RATE

CKRAT0: RATE0
        TSTB
        BEQ     PTEQST          ;IF RATE=0 THEN CHECK THE POTTMP VS SETTMP

* RATE <> 0 STATE STILL = 1

LDAA    #1D
        STAA    HSTATE
        JMP     NSFEND          ;THEN END

* POTTMP > SETTMP

PTEQST: LDAA    SURANS
        BPL     SETMN           ;IF POTTMP < SETTMP SEE IF ( SETTMP-10

* POTTMP > SETTMP ... STATE = 3

LDAA    #3D
        STAA    HSTATE
        JMP     NSFEND

* POTTMP < SETTMP - 10 ?

SETMN:  LDAB    SURANS
```

```
312             SUBB    #11D                    ;IF SO, MAKE THE NEW STATE = 2
313             BPL     MSTA2
314     *   ...ELSE MAKE THE STATE = 5 CUZ POTTMP >= SETTMP - 10
315
316             LDAA    #5D
317             STAA    HSTATE
318             STMPOF                          ;START THE MP OFF TIME CLOCK
319             JMP     NSFEND                  ;THEN END
320
321     * MAKE THE STATE = 2 CUZ POTTMP < ( SETTMP - 10
322
323     MSTA2:  STMPOF
324             LDAA    #2D
325             STAA    HSTATE
326             JMP     NSFEND                  ;THEN END
327
328     * IS THE CURRENT STATE = 2 (ADH) ?
329
330     HSTAT2: CMPA    #2D
331             BNE     HSTAT3                  ;IF NOT SEE IF THE STATE = 3
332
333     * POTTMP < SETTMP - N1
334
335             LDAB    SUBANS
336             SUBB    #1D
337             SUBB    N1
338             BMI     PTSTG4
339
341             CLR     RATCLK+1
342             CLR     RATCLK
343             LDAA    MSFLG4
344             ANDA    #$FB
345             STAA    MSFLG4                  ;RESET THE RATE CLOCK
346             JMP     NSFEND                  ;AND END
347
348     * POTTMP >= SETTMP - 10
349
350     PTSTG4: LDAB    SUBANS
351             SUBB    #11D
352             BMI     MSTAT1                  ;IF SO THEN MAKE THE STATE = 1
353
354     * ITS NOT SO MAKE THE STATE = 2
355
356             LDAA    #2D
357             STAA    HSTATE
358             JMP     NSFEND
359
360     * MAKE THE STATE = 1 CUZ POTTMP >= SETTMP - 10
361
362     MSTAT1: CLR     RATCLK+1
363             CLR     RATCLK
364             LDAA    MSFLG4
365             ANDA    #$FB
366             STAA    MSFLG4                  ;RESET THE RATE CLOCK
367             LDAA    #1D
368             STAA    HSTATE
369             JMP     NSFEND                  ;THEN END
370
371     * IS THE CURRENT STATE = 3 (ADJ) ?
372
373     HSTAT3: CMPA    #3D
374             BNE     HSTAT4                  ;IF NOT SEE IF IT IS 4
375
```

```
*   POTTMP = SETTMP ?

TST    SUBANS
            BNE    CSTAT3        ;IF NOT MAKE THE STATE = 3

*   IF SO THEN STATE = 4

LDAA   #4D
            STAA   HSTATE
            JMP    NSFEND        ;THEN END

*   SEE IF THE STATE SHOULD STILL BE 3

CSTAT3: BMI    HSTAT3        ;IF POTTMP > SETTMP STILL STATE 3

*   ELSE MAKE STATE = 5

LDAA   #5D
            STAA   HSTATE
            STMPOF                ;START THE MF OFF CLOCK
            JMP    NSFEND

*   MAKE THE STATE = 3

HSTAT3: LDAA   #3D
            STAA   HSTATE
            JMP    NSFEND

*   SEE IF THE STATE = 4

HSTAT4: CMPA   #4D
            BEQ    CPSTMP        ;IF SO THEN CHECK THE POTTMP
            JMP    ITSTA5        ;IF NOT ITS STATE 5

*   POTTMP < SETTMP

CPSTMP: LDAA   POTTMP
            CMPA   SETTMP
            BHI    STA3
            BLO    STA6

*   POTTMP=SETTMP, MAKE STATE=4

DOST4:  LDAA   #4D
            STAA   HSTATE
            JMP    NSFEND        ;THEN END

*   POTTMP < SETTMP DO STATE 6

STA6:   DOTONP
            LDAA   #6D
            STAA   HSTATE
            JMP    NSFEND

*   POTTMP > SETTMP, MAKE STATE = 3

STA3:   LDAA   SUBANS
            CMPA   #1D
            BHS    DOST3
            BRA    DOST4
    DOST3:  LDAA   #3D
            STAA   HSTATE
            DOTONH                ;ADJUST T ON DOWN
            JMP    NSFEND        ;THEN END
```

```
441        * IT'S STATE 5 , FIND OUT WHERE TO GO FROM HERE
442
443        ITSTA5:  CMPA    #5D
444                 BNE     ITSSIX
445                 TST     SUBANS
446                 BEQ     DOSTA4          ;IF POTTMP = SETTMP MAINTAIN
447                 LDAB    SUBANS
448                 BMI     F5TO3           ;IF POTTMP > SETTMP MAKE IT STATE 3
449                 SUBB    #11D
450                 BPL     ITSST2          ;IF POTTMP < SETTMP - 10 DO STATE = 2
451
452        * ...ELSE STILL STATE 5
453
454        STAT5:   LDAA    #5D
455                 STAA    HSTATE
456                 BRA     NSFEND
457
458        * MAKE IT STATE 4
459
460        DOSTA4:  LDAA    #4D
461                 STAA    HSTATE
462                 BRA     NSFEND          ;THEN END
463
464        * STATE WENT FROM 5 TO 3
465
466        F5TO3:   LDAA    #3D
467                 STAA    HSTATE
468                 BRA     NSFEND
469
470        * POTTMP < SETTMP - 10 MAKE STATE = 2
471
472        ITSST2:  LDAA    #2D
473                 STAA    HSTATE
474                 BRA     NSFEND
475
476        * THE STATE IS SIX FIND OUT WHERE TO GO
477
478        ITSSIX:  TST     SUBANS
479                 BEQ     MAKIT4          ;IF TP=TS MANTAN
480
481                 LDAA    SUBANS
482                 CMPA    #1D
483                 BEQ     STILSX
484
485                 DOTONP                  ;ADJUST AND THE EXTRA PULSE
486                 LDAA    #5D
487                 STAA    HSTATE
488                 BRA     NSFEND
489
490        MAKIT4:  LDAA    #4D
491                 STAA    HSTATE
492                 JMP     NSFEND
493
494        STILSX:  LDAA    #6D
495                 STAA    HSTATE
496
497        * END THE FIND THE NEXT PID HEAT STATE ROUTINE
498
499        NSFEND:  ENDM
500                 PAGE
```

```
************************************************************************
* MANTAN
* MACRO TO EXECUTE THE MAINTAIN PULSE RATE STATE
*
*   I/O:           INPUTS:   HFOFF,MSFLG4,MISLED2
*                  OUTPUTS:  MSFLG4,MFON,MISLED2
*
*   ERROR HANDLING:          NONE
*   OTHER ROUTINES CALLED:   NONE
*   MACHINE EXIT STATE:      ACCUM. A, CCR - INDETERMINATE
*                            ACCUM. B, X-REG. - UNCHANGED
*
*   CREATE DATE:
*   REVISION DATE:
*   REVISION LEVEL:          A
*   REVISION RECORD:         A - ORIGINAL
************************************************************************

* IS THE HF-OFF TIME CLOCK RUNNING?

MANTAN: MACRO

LDAA    MSFLG4
        ANDA    #$02
        BEQ     REINON          ;IF SO THEN RE-INIT THE ON TIME CLOCK AND TURN OFF CONTAX

* ELSE IS THE ON CLOCK RUNNING ?

LDAA    MSFLG4
        ANDA    #$01
        BEQ     REINOF          ;IF SO THEN RE-INIT THE OFF TIME CLOCK AND TURN ON THE CONTAX

* IF BOTH TIMED OUT CHECK THE LAST STATE OF THE CONTAX

LDAA    MISLED2
        ANDA    #$40
        BEQ     STRTON          ;IF THE CONTAX WERE OFF THEN START THE ON CLOCK

* ELSE THE CONTAX WERE ON SO START THE OFF CLOCK

LDAA    MSFLG4
        ANDA    #$FD
        STAA    MSFLG4
        BRA     MNTNEN

* START THE ON CLOCK AND END

STRTON: LDAA    MSFLG4
        ANDA    #$FE
        STAA    MSFLG4
        BRA     MNTNEN

* RE-INIT THE OFF CLOCK AND TURN ON THE CONTAX

REINOF: LDAA    MFOFFI
        STAA    MFOFF+1
        CLR     MFOFF
        LDAA    MISLED2
        ORAA    #$40
        STAA    MISLED2
        BRA     MNTNEN          ;THEN END

* RE-INIT THE ON CLOCK AND TURN OFF THE CONTAX

REINON: LDAA    TON
```

```
566           STAA   MFON
567           LDAA   TON+1
568           STAA   MFON+1
569           LDAA   MISLED2
570           ANDA   #$BF
571           STAA   MISLED2
572
573   * END THE MAITAIN PULSE ROUTINE
574
575   MNTNFN: ENDM
576           PAGE
577   ***********************************************************************
578   * EXTPLS
579   * SUBROUTINE TO EXECUTE THE EXTRA PULSE STATE
580   *
581   * I/O:      INPUTS:  TON,MSFLG4,SLTTMP,POTTMP,MISLED2
582   *           OUTPUTS: MFOFF,MFON,MSFLG4,MISLED2
583   *
584   * ERROR HANDLING:              NONE
585   * OTHER ROUTINES CALLED:       NONE
586   * MACHINE EXIT STATE:          ACCUM. A, CCR - INDETERMINATE
587   *                              ACCUM. B, X-REG. - UNCHANGED
588   *
589   * CREATE DATE:
590   * REVISION DATE:         A
591   * REVISION LEVEL:        A
592   * REVISION RECORD:       A - ORIGINAL
593   ***********************************************************************
594
595   * IS THE MF-OFF TIME CLOCK RUNNING ?
596
597           B6 00 00   EXTPLS: LDAA  MSFLG4
598           04 02             ANDA  #$02
599           27 35             BEQ   ONREIN         ;IF SO THEN REINIT THE ON AND TURN OFF THE CONTAX
600
601   * IS THE MF-ON TIME CLOCK RUNNING ?
602
603           B6 00 00           LDAA  MSFLG4
604           04 01              ANDA  #$01
605           27 18              BEQ   OFKEIN         ;IF SO THEN REINIT THE OFF AND TURN ON THE CONTAX
606
607   * ELSE CHECK FOR THE LAST STATE OF THE CONTAX
608
609           B6 00 00           LDAA  MISLED2
610           04 40              ANDA  #$40
611           27 0A              BEQ   ONSTRT         ;IF THEY WERE OFF START THE ON CLOCK
612
613   * IF THE CONTAX WERE ON START THE OFF CLOCK
614
615           B6 00 00           LDAA  MSFLG4
616           04 FD              ANDA  #$FD
617           B7 00 00           STAA  MSFLG4
618           20 49              BRA   EXPLEN         ;THEN END
619
620   * START THE ON CLOCK
621
622           B6 00 00   ONSTRT: LDAA  MSFLG4
623           04 FE              ANDA  #$FE
624           B7 00 00           STAA  MSFLG4
625           20 3F              BRA   EXPLEN         ;AND THEN END
626
627   * REINIT THE OFF CLOCK AND TURN ON THE CONTAX
628
629           B6 00 00   OFREIN: LDAA  MFOFF
630           B7 00 01           STAA  MFOFF+1
```

```
631  0033                    CLR      HFOLF
632  0036   7F 00 00          LDAA     HISLED2
633  0039   86 48              ORAA     #$40
634  003B   B7 00 00           STAA     HISLED2
635  003E   20 2C              BRA      EXFLEN           ;THEN END
636
637  * REINIT THE ON CLOCK AND TURN OFF THE CONTAX
638
639  0040   B6 00 00  ONRFIN: LDAA     SETIHP
640  0043   80 00              SUBA     POTIHP
641  0046   B8 00 01           STAA     TON+1
642  0049   B7 00 00           LDAA     HPON+1
643  004C   B6 00 00           SUBA     SETIHP
644  004F   B0 00 02           SUBA     POTIHP
645  0052   F6 00 00           LDAB     ADJ2
646  0055   3D                 MUL
647  0056   C1 64     GN100:  CMPB     #100D
648  0058   25 07              BLO      STONP
649  005A   C0 64              SUBB     #100D
650  005C   7C 00 01           INC      HPON+1           ;ADD 1 SECOND TO TON CUZ MULT CAUSED > 100
651  005F   20 F5              BRA      GN100
652  0061   F7 00 00  STONP:  STAB     HPON
653  0064   B6 00 00           LDAA     HISLED2
654  0067   84 BF              ANDA     #$BF
655  0069   B7 00 00           STAA     HISLED2
656
657  * END THE EXTRA PULSE ROUTINE
658
659  006C   39        EXFLEN: RTS
660                            PAGE
661  ****************************************************************************
662  * EXISTA
663  * MACRO TO EXECUTE THE CURRENT FID HEAT STATE
664  *
665  *   I/O:              INPUTS:  HSTATE,HISLED2
666  *                     OUTPUTS: HISLED2
667  *
668  *   ERROR HANDLING:                     NONE
669  *   OTHER ROUTINES CALLED:              MANTAN,EXTFLS
670  *   MACHINE EXIT STATE:                 ALL REGISTERS - INDETERMINATE
671  *
672  *   CREATE DATE:
673  *   REVISION DATE:
674  *   REVISION LEVEL:     A
675  *   REVISION RECORD:    A - ORIGINAL
676  ****************************************************************************
677
678  * IS THE CURRENT STATE = 0 (IHU)
679
680  EXHSTA: MACRO
681
682                    LDAA     HSTATE
683                    TSTA
684                    BNE      STATH1           ;IF NOT 0 IS IT 1
685
686  * STATE = 0 TURN ON CONTAX
687
688  DCONON: LDAA     HISLED2
689                    ORAA     #$40
690                    STAA     HISLED2
691                    JMP      XHSEND           ;THEN END
692
693  * IS THE CURRENT STATE = 1 (ICD) ?
694
695  STATH1: CMPA     #1D
```

```
696              BNE       STATH2
697  * IF SO JUST TURN THE CONTAX OFF
698
699  DCONOF: LDAA      MISLED2
700          ANDA      #$DF
701          STAA      MISLED2
702          JMP       XHSEND        ;THEN END
703
704  * IS THE CURRENT STATE = 2 (ADD) ?
705
706  STATH2: CMPA      #2D
707          BEQ       DCONON        ;IF SO JUST TURN THE CONTAX ON
708
709  * ...ELSE IS THE CURRENT STATE = 3 (WAIT) ?
710
711          CMPA      #3D
712          BNE       ISIT4
713          LDAA      MSFLG4
714          ANDA      #$W?
715          BEQ       DCONOF        ;IF WE ARE WAITING AND UP OR DN CUBE LINES OUT
716          BRA       DCONOF        ;IF SO JUST TURN THE CONTAX OFF
717
718  * IS THE STATE = 4 (MAINTAIN) ?
719
720  ISIT4:  CMPA      #4D
721          BEQ       MAINTN        ;IF SO DO THE MAINTAIN ROUTINE
722          JMP       STATH5        ;ELSE DO THE STATE = 5 ROUTINE
723
724  MAINTN: MANTAN
725          JMP       XHSEND        ;THEN END
726
727  * STATE = 5 DO EXTRA PULSE ROUTINE
728
729  STATH5: CMPA      #5D
730          BEQ       DOEXTR
731          JMP       STATH6
732
733  DOEXTR: JSR       EXIPLS
734          JMP       XHSEND
735
736  * STATE = SIX
737
738  STATH6: JSR       EXTPLS
739
740  * END THE PID STATE EXECUTION MACRO
741
742  XHSEND: ENDM
743          PAGE
744  *****************************************************************
745  * PROPOR
746  * SUBROUTINE TO EXECUTE THE CYCLE IDLE PROPORTIONAL CONTROL ROUTINES
747  *
748  * I/O:    INPUTS:    NONE                    NONE
749  *         OUTPUTS:   NONE                    NONE
750  *
751  * ERROR HANDLING:                            NONE
752  * OTHER ROUTINES CALLED:                     NSFIND,EXHSTA
753  * MACHINE EXIT STATE:                        ALL REGISTERS - INDETERMINATE
754  *
755  * CREATE DATE:
756  * REVISION DATE:
757  * REVISION LEVEL:            A
758  * REVISION RECORD:           A - ORIGINAL
759  *****************************************************************
```

```
762                        * FIND THE NEXT STATE
763
764
765   006D  86 00         PROFOR: LDAA   #$00
766   006F  B7 00 00              STAA   TIMERSTA        ;DON'T ALLOW TIMER INT'S HERE
767
768   0072  B6 00 00              LDAA   POTTMP
769   0075  81 FE                 CMPA   #254D           ;SEE IF THE TEMP IS LOW
770   0077  27 1E                 BEQ    DONSF           ;IF SO DO HEAT STUFF
771
772   0079  B6 00 00              LDAA   SETTMP
773   007C  B7 00 00              STAA   SAVER
774   007F  BD 00 00              JSR    SUBTRC          ;GET POTTMP-SETTMP RATIO
775
776   0082  B6 00 00              LDAA   SUBANS
777   0085  2A 10                 BPL    DONSF
778   0087  43                    COMA
779   0088  81 02                 CMPA   #2D
780   008A  23 0B                 BLS    DONSF           ;IF POTTMP (= SETTMP+2 FIND NEXT STATE
781
782                        * ELSE SAVE THE WORLD BY TURNING OF THE CONTAX
783
784   008C  B6 00 00              LDAA   MISLED2
785   008F  84 BF                 ANDA   #$BF
786   0091  B7 00 00              STAA   MISLED2
787   0094  7E 03 59              JMP    ENCHET
788
789                        * FIND THE NEXT STATE
790
791   0097                 DONSF: NSFIND
1106
1107                       * EXECUTE THE STATE
1108
1109   02A0                       EXISTA
1319
1320                       * END THE ROUTINE
1321
1322   035A  86 00         ENCHET: LDAA  #$00
1323   035C  B7 00 00              STAA  TIMERSTA        ;ALLOW INT'S AGAIN
1324   035F  39                    RTS
1325                              PAGE
1326
1327                       * END THE FILE
1328
1329   035F                       END
```

The preceding has been a description of the preferred embodiments of the present invention, however, various modifications will be apparent to one of ordinary skill in the art without departing from the scope and spirit of the invention. The scope of the invention is only to be limited by the appended claims.

We claim:

1. A controller for use with a cooking system wherein said cooking system comprises a cooking vessel for holding a cooking medium and for receiving a plurality of types of food products, a heating element for heating the cooking medium and temperature sensor means for sensing the temperature of the cooking medium, said controller comprising:
heating element control means for controlling the operation of said heating element to enable said heating element to be in one of a plurality of modes including at least a pulsed mode and a full on mode;
temperature selector means for selecting a first selected temperature;
proportional control factor selector means operable by a user of said controller for selecting a proportional control factor independently of said first selected temperature, said proportional control factor selector means further establishing a second selected temperature a number of degrees below said first selected temperature corresponding to said proportional control factor;
wherein said heating element control means is responsive to said proportional control factor selector means for selectively controlling the operation of said heating element
(a) in said full on mode when said sensed temperature is below said second selected temperature, and
(b) in said pulsed mode when said sensed temperature is below said first selected temperature and above said second selected temperature.

2. A cooking system for cooking a plurality of food products comprising:
cooking vessel means for holding a cooking medium;
temperature sensor means for sensing the temperature of said cooking medium;
first temperature selector means for selecting a first selected temperature of the cooking medium;
second temperature selector means for independently selecting a second selected temperature a number of degrees below said first selected temperature;
heating element means for heating the cooking medium;
and heating element control means for controlling the operation of the heating element, said heating element control means selectively controlling said heating element means to be
(a) in a full on mode when said sensed temperature of the cooking medium is below said second selected temperature, and
(b) in a pulsed mode when said sensed temperature is below said first selected temperature and above said second selected temperature.

3. The controller of claim 1 or 2 wherein said full on mode is terminated at said second selected temperature, and upon termination of said full on mode, said heating element control means controls said heating element in a third mode until the occurrence of a predetermined condition.

4. The controller of claim 3 wherein said predetermined condition occurs when the temperature rate of change of the cooking medium is less than or equal to a predetermined value.

5. The controller of claim 4 wherein in said third mode said heating element operates in a wait mode.

6. The controller of claim 5 wherein said proportional control factor may be selected such that said second selected temperature is 0–30 degrees below said first selected temperature.

7. The controller of claim 5 further comprising means for establishing a temperature range extending a predetermined number of degrees below said first selected temperature wherein said heating element control means may operate said heating element in said pulsed mode only when the second temperature is within said temperature range.

8. The controller of claim 7 wherein said temperature range may extend 5 to 15 degrees below said first selected temperature.

9. The controller of claim 8 wherein upon the occurrence of said predetermined condition, the heating element is controlled
(a) in a fourth mode if said sensed temperature is greater than said first selected temperature;
(b) in said full on mode if said sensed temperature is below said temperature range, and
(c) in a pulsed mode if said sensed temperature is within said temperature range.

10. The controller of claim 7 wherein in said fourth mode, said heating element control means places said heating element in a wait state.

11. The controller of claim 1 or 2 wherein in said pulsed mode said heating element control means controls said heating element to be in a pulsed mode with a variable duty cycle.

12. The controller of claim 11 wherein said duty cycle is varied in a first predetermined manner when said sensed temperature is greater than said first selected temperature.

13. The controller of claim 12 wherein said duty cycle is varied in a second predetermined manner when said heating element is operated in said pulsed mode and said first selected temperature is greater than said sensed temperature.

14. The controller of claim 13 wherein said duty cycle comprises an on time and an off time for the heating element and said first predetermined manner comprises decreasing said on time by a predetermined amount and said second predetermined manner comprises increasing said on time by a predetermined amount.

15. The controller of claim 1 or 2 further comprising storage means for storing and selectively retrieving information for a plurality of food products for use in operating the cooking system in various cycles, said information comprising at least one of time, temperature, pressure, alarm, and mode information; and
further wherein said mode information is received by said heating element control means to control said heating element to operate in a fifth mode.

16. The controller of claim 15 wherein in said fifth mode said heating element automatically operates in an idle mode to maintain the temperature of said cooking medium at a temperature below said first selected temperature.

17. The controller of claim 16 wherein said mode information may comprise first idle mode information or second idle mode information to enable said heating element control means to place said heating element in said idle mode in a plurality of ways.

18. The controller of claim 17 wherein receipt of said first idle mode information by said heating element control means causes said heating element to automatically operate in said idle mode when a selected amount of time has elapsed since a selective retrieval of information; and receipt of said second idle mode information by said heating element control means causes said heating element to automatically operate in said idle mode when a selected amount of time has elapsed since completion of a cycle.

19. The controller of claim 3 wherein said predetermined condition occurs when the temperature rate of change of the cooking medium equals zero.

20. The controller of claim 15 wherein said information further comprises load anticipation information; and said control means uses said load anticipation information to control said heating element to be in a load anticipation mode in response to the initiation of a cooking cycle.

21. The controller of claim 20 wherein said load anticipation information comprises a load anticipation factor relating to a third selected temperature;

wherein said heating element control means precludes said load anticipation mode if said sensed temperature is above or rises above said third selected temperature.

22. The controller of claim 1 or 2 further comprising storage and retrieval means for selectively storing and retrieving information for a plurality of food products, said information comprising at least one of time, temperature, pressure, alarm and mode information wherein said information is used to operate the cooking system for a plurality of cycles; and further comprising cycle usage means for storing information relating to the number of times said cycles have been used; and usage review means for selectively providing an indication of the number of times a cycle has been used.

23. The controller of claim 22 wherein said cycle usage means stores an indication of the number of times a cycle was used since a first predetermined event and the number of times all cycles were used since a second predetermined event.

24. The controller of claim 23 wherein said first predetermined event is the initialization of said cycle usage means for a particular cycle; and said second predetermined event is the initialization of said cycle usage means for all cycles.

25. The controller of claims 1 or 2 further comprising:

power supply means for suppling power to said controller to enable cooking operations to be carried out;

storage and retrieval means for selectively storing and retrieving information for a plurality of food products, or said controller using said information to selectively operate said cooking system for a plurality of cycles to cook a plurality of food products, said information comprising time and temperature information relating to the time for which and temperature at which a food product is to be cooked;

memory means in said controller for storing information relating to a cook cycle in progress in the event that said power is temporarily interrupted; and comparator means for comparing the sensed temperature with said first selected temperature when said temporary interruption is terminated, said comparator means further generating a first control signal when said sensed temperature is within a predetermined number of degrees of said first selected temperature and a second control signal when said sensed temperature is more than a predetermined number of degrees below said first selected temperature, said first control signal causing said heating element control means to continue said cycle in progress and said second control signal causing said heating element control means to abort said cycle in progress.

26. In a computer controlled cooking system for cooking a plurality of food products in a cooking medium, a method of indicating a predetermined condition of said cooking medium comprising the steps of:

selecting a number to associate with each of said plurality of food products;

storing a value related to said number for each food product;

initializing a counter with an initial value to produce a counter value;

selectively cooking at least one food product;

adding said stored value associated with said at least one food product to said counter value each time a food product is cooked;

providing an indication when said counter value is within a predetermined amount of a selected value.

27. The method of claim 26 wherein said stored value is the reciprocal of said selected number associated with a respective food product and the number associated with said food products represents the number of times that type of product would have to be cooked if only that product were cooked to cause said indication to be provided.

28. The method of claim 27 wherein said selected value is 1.

29. The method of claim 26 wherein said initial value is 0 and each time a food product is cooked, the reciprocal of the number associated with that product is added to said counter value; and when said counter value is approximately equal to 1, said indication is provided.

30. In a cooking system comprising a cooking vessel, a heating element, a heating element control, a temperature sensor operatively connected to sense the temperature of a cooking medium in the cooking vessel and provide an indication of said temperature to said heating element control, and first, second and third temperature selectors, a method of controlling the operation of said heating element comprising the steps of:

selecting a first selected temperature corresponding to a desired cooking temperature;

selecting a second selected temperature independently of said first selected temperature corresponding to a temperature a number of degrees below said first selected temperature;

selecting a third selected temperature which is a number of degrees below said first selected temperature to establish a temperature range extending from said third selected temperature to said first selected temperature;

controlling said heating element to operate in a full on mode when the temperature of the cooking medium is below said second selected temperature; and terminating said full on mode when the temperature of said cooking medium is at said second selected temperature.

31. The method of claim 30 further comprising the steps of:

operating said heating element in a pulsed mode at predetermined times when said cooking medium temperature is within said temperature range.

32. The method of claim 31 further comprising the steps of:

operating said heating element in a third mode upon the termination of said full on mode until the occurrence of a predetermined condition; and operating the heating element in said pulsed mode when said predetermined condition occurs and said sensed temperature is in said temperature range.

33. The method of claim 32 wherein in said pulsed mode said heating element is pulsed with a predetermined on time and a predetermined off time, further comprising the steps of:

modifying said on time when operation of said heating element in said pulsed mode fails to cause said cooking medium temperature to become equal to said first selected temperature.

34. The method of claim 30 further comprising the steps of:

storing information relating to the cooking of a plurality of food products;

cooking a food product according to said stored information;

wherein said stored information comprises a weighting factor associated with each of said plurality of food products.

35. The method of claim 34 further comprising the steps of:

storing a number corresponding to said weighting factor each time a product is cooked; and providing an indication when the total of said stored numbers exceeds a predetermined value.

36. In a computer controlled cooking system for cooking a plurality of food products, an apparatus for determining the condition of a cooking medium comprising:

means for selecting a number representing the number of times a type of food product can be cooked in said cooking medium;

means for storing a number related to said selected number;

means for adding said related number to a counter when said food product is cooked; and means for providing an indication of the condition of said cooking medium when said counter reaches a predetermined value.

37. The apparatus of claim 36 wherein said means for selecting enables a user to select a number for each type of food product.

38. The apparatus of claim 36 wherein said related number is the reciprocal of said selected number.

* * * * *